(12) United States Patent
Tokunaga et al.

(10) Patent No.: US 11,316,403 B2
(45) Date of Patent: Apr. 26, 2022

(54) ELECTRIC MOTOR SYSTEM

(71) Applicant: DENSO CORPORATION, Kariya (JP)

(72) Inventors: Masao Tokunaga, Nisshin (JP);
Masanori Yasuda, Nisshin (JP); Koji Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 588 days.

(21) Appl. No.: 16/324,135

(22) PCT Filed: Jul. 13, 2017

(86) PCT No.: PCT/JP2017/025585
§ 371 (c)(1),
(2) Date: Feb. 8, 2019

(87) PCT Pub. No.: WO2018/030064
PCT Pub. Date: Feb. 15, 2018

(65) Prior Publication Data
US 2021/0336507 A1    Oct. 28, 2021

(30) Foreign Application Priority Data

Aug. 12, 2016  (JP) .............................. JP2016-158997

(51) Int. Cl.
*H02K 7/09* (2006.01)
*F16C 32/04* (2006.01)
*H02K 11/215* (2016.01)

(52) U.S. Cl.
CPC ............. *H02K 7/09* (2013.01); *F16C 32/048* (2013.01); *F16C 32/0444* (2013.01); *F16C 32/0468* (2013.01); *H02K 11/215* (2016.01)

(58) Field of Classification Search
CPC ..... H02K 7/09; H02K 11/215; F16C 32/0444; F16C 32/048; F16C 32/0468
(Continued)

(56) References Cited

U.S. PATENT DOCUMENTS

| | | | | |
|---|---|---|---|---|
| 5,939,813 A | * | 8/1999 | Schob ...................... | H02K 7/09 310/425 |
| 6,130,494 A | * | 10/2000 | Schob ................. | F16C 32/0463 310/90.5 |

(Continued)

FOREIGN PATENT DOCUMENTS

| | | | | |
|---|---|---|---|---|
| JP | 2003166554 A | | 6/2003 | |
| JP | 2005061580 A | * | 3/2005 | ............ F16C 32/048 |

OTHER PUBLICATIONS

English translation summary, JP-2005061580-A, printed on Sep. 1, 2021.*

*Primary Examiner* — John K Kim
(74) *Attorney, Agent, or Firm* — Harness, Dickey & Pierce, P.L.C.

(57) ABSTRACT

An electric motor system includes a rotary shaft having an axis line displaceable relative to a rotation center, a magnetic bearing for supporting the rotary shaft, a permanent magnet mounted on the rotary shaft and having a plurality of magnetic poles arranged in a circumferential direction around the axis line of the rotary shaft, three detection elements arranged in the circumferential direction around the rotation center for detecting a magnetic flux generated from the permanent magnet, and a coordinate detection section for determining coordinates of the axis line of the rotary shaft based on output values of two detection elements selected out of the three detection elements in accordance with a rotation angle of the rotary shaft.

9 Claims, 16 Drawing Sheets

(58) Field of Classification Search
USPC .................................... 310/68 B, 90.5
See application file for complete search history.

(56) References Cited

U.S. PATENT DOCUMENTS

| | | | | |
|---|---|---|---|---|
| 6,320,290 | B1* | 11/2001 | Kanebako | H02K 7/09 |
| | | | | 310/90.5 |
| 6,359,357 | B1* | 3/2002 | Blumenstock | F16C 32/0465 |
| | | | | 310/90.5 |
| 8,288,906 | B2* | 10/2012 | Onuma | F16C 32/0465 |
| | | | | 310/90.5 |
| 2002/0074883 | A1* | 6/2002 | Yamauchi | F16C 32/0444 |
| | | | | 310/90.5 |
| 2010/0172775 | A1* | 7/2010 | Onuma | F16C 32/048 |
| | | | | 417/423.7 |
| 2010/0231076 | A1* | 9/2010 | Chiba | H02K 7/09 |
| | | | | 310/90.5 |
| 2014/0199179 | A1* | 7/2014 | Da Silva | F04D 29/058 |
| | | | | 417/44.1 |
| 2015/0275964 | A1* | 10/2015 | Moravec | F16C 32/0487 |
| | | | | 310/90.5 |
| 2015/0330444 | A1* | 11/2015 | Wang | F04D 17/10 |
| | | | | 310/90.5 |
| 2017/0040868 | A1* | 2/2017 | Noh | F04D 13/064 |

* cited by examiner

50a : U1-PHASE COIL
50b : V1-PHASE COIL
50c : W1-PHASE COIL

51a : U2-PHASE COIL
51b : V2-PHASE COIL
51c : W2-PHASE COIL

ELECTRIC MOTOR SYSTEM

CROSS REFERENCE TO RELATED APPLICATIONS

This application is a U.S. National Phase Application under 35 U.S.C. 371 of International Application No. PCT/JP2017/025585 filed on Jul. 13, 2017. This application is based on and claims the benefit of priority from Japanese Patent Application No. 2016-158997 filed on Aug. 12, 2016. The entire disclosures of all of the above applications are incorporated herein by reference.

TECHNICAL FIELD

The present disclosure relates to an electric motor system.

BACKGROUND ART

Conventionally, an electric motor system is formed of an electric motor that outputs a rotational force from a rotary shaft, a magnetic bearing that supports the rotary shaft by electromagnetic action, and first to fourth sensors that detect distances between the rotary shaft and the sensors, respectively (for example, refer to Patent Document 1).

The first to fourth sensors are arranged on an outer peripheral side of the rotary shaft of the electric motor. The first to fourth sensors are arranged in a circumferential direction around an axis of the rotary shaft.

Furthermore, the electric motor system is provided with a control device for controlling the magnetic bearing so that the distance between the rotary shaft and the sensor approaches a fixed value for each sensor based on output signals from the first to fourth sensors.

As a result, an axis line of the rotary shaft of the electric motor is brought close to a rotation center.

PRIOR ART LITERATURE

Patent Literature

Patent Literature 1: JP 2003-166554 A

SUMMARY

In the electric blower described above, a control device controls the magnetic bearing based on output signals of the first to fourth sensors, so that the axis line of the rotary shaft of the electric motor is brought close to the rotation center. However, it is necessary to use four sensors such as the first to fourth sensors for one magnetic bearing.

The sensor described in Patent Document 1 is a vibration sensor that detects a fluctuation in a gap between the rotary shaft and the sensor. According to the study of the inventors of the present invention, since each of these sensors is a vibration sensor, it measures only an absolute value of a deviation amount of the rotary shaft. Therefore, in order to detect an amount of deviation from an axis in an X-Y plane, four sensors need be installed in total, that is, in a positive direction of an X axis, in a negative direction of the X axis, in a positive direction of a Y axis and in a negative direction of a Y axis.

The present disclosure has an object to reduce the number of sensors used for controlling a magnetic bearing in an electric motor system that supports a rotary shaft by the magnetic bearing.

According to one aspect of the present disclosure, an electric motor system includes a rotor, a rotary shaft having an axis line displaceable with respect to a rotation center and outputting a rotational force of the rotor, a stator for generating the rotational force on the rotor by an electromagnetic force, a magnetic bearing for supporting the rotary shaft rotatably by a n electromagnetic force, a permanent magnet mounted on the rotary shaft and having a plurality of magnetic poles arranged in a circumferential direction around the axis line of the rotary shaft, three detection elements arranged in the circumferential direction around the rotation center for detecting a magnetic flux generated from the permanent magnet, a coordinate detection section for determining coordinates of the axis line of the rotary shaft based on output values of two detection elements selected out of the three detection elements in accordance with a rotation angle of the rotary shaft, and a control section for controlling the magnetic bearing so that the axis line of the rotary shaft is brought to be close to the rotation center based on the coordinates determined by the coordinate detection section.

As described above, the control section controls the magnetic bearing so that the axis line of the rotary shaft approaches the rotation center based on the output values of the two detection elements selected out of the three detection elements, which detects the magnetic flux generated by the permanent magnet, according to the rotation angle of the rotary shaft. Since three detection elements detect the magnetic flux, a distance from each detection element to the magnet is specified by using the detection result of the individual detection element. Therefore, it is possible to reduce the number of detection elements as compared with the conventional case. If the distance from the two detection elements to the magnet are determined, the coordinates of the axis line is determined. However, since the output signal of the detection element which is close to a boundary of the plurality of magnetic poles arranged in the circumferential direction becomes unstable, three detection elements are required. For this reason, it is possible to reduce the number of sensors used for controlling the magnetic bearing in the electric motor system that supports the rotary shaft by the magnetic bearing.

EMBODIMENT

Hereinafter, an electric motor system 1 according to the present embodiment will be described with reference to FIG. 1, FIG. 2 and the like.

Figure 1:
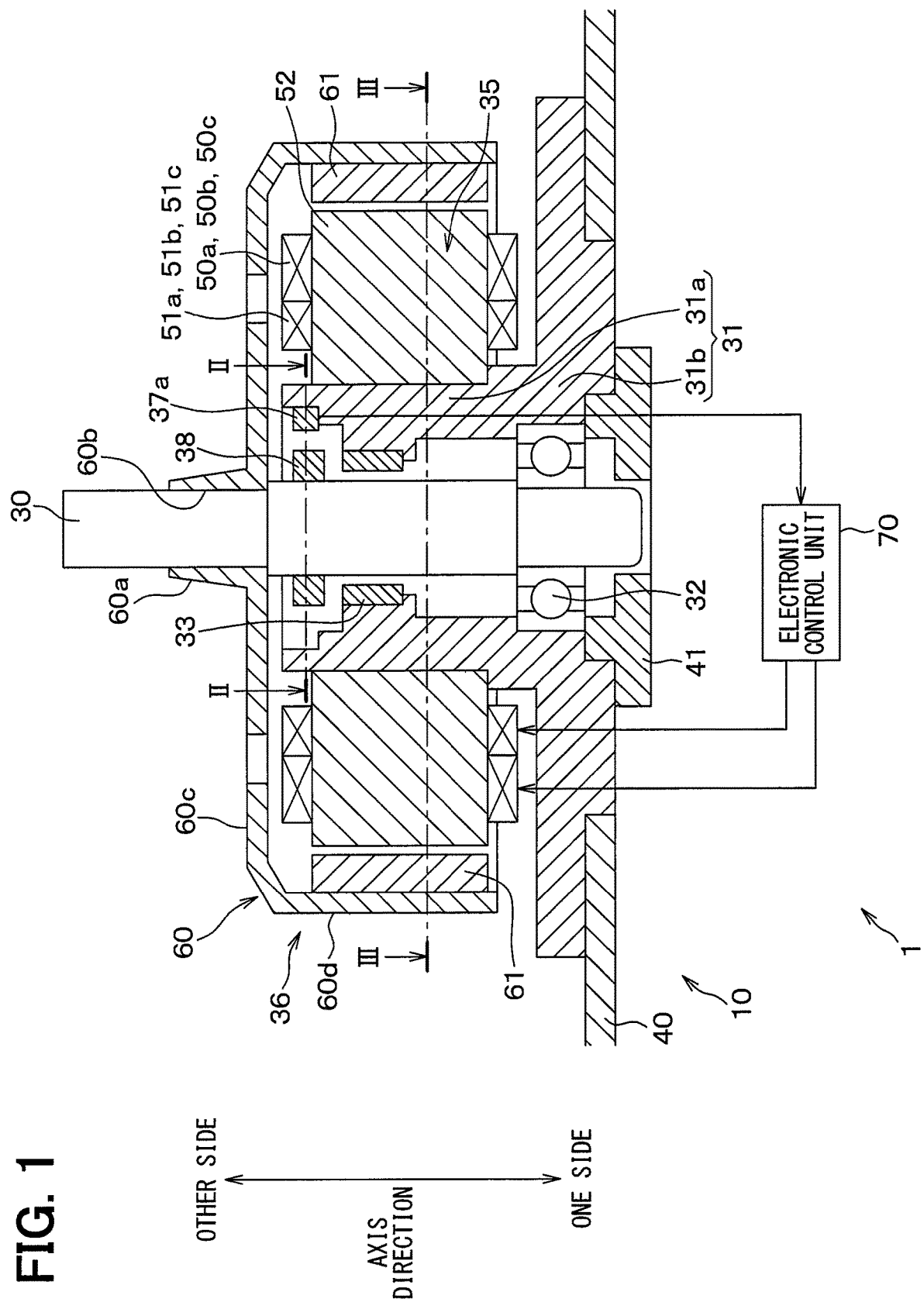
FIG. 1 is a diagram showing an overall configuration of a motor control system according to one embodiment.
Figure 2:
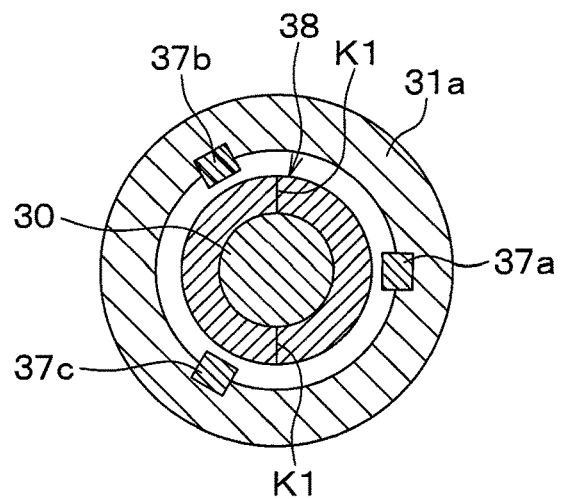
FIG. 2 is a cross-sectional view taken along line II-II shown in FIG. 1.

As shown in FIG. 1 and FIG. 2, the electric motor system 1 of the present embodiment includes an electric motor 10.

The electric motor 10 includes a rotary shaft 30, a center piece 31, a bearing 32, a holding member 33, a stator 35, a rotor 36, Hall elements 37a, 37b, 37c, and a permanent magnet 38.

The rotary shaft 30 is a rotary shaft that transmits a rotational force of the rotor 36 to an object to be driven such as a fan.

Figure 7:
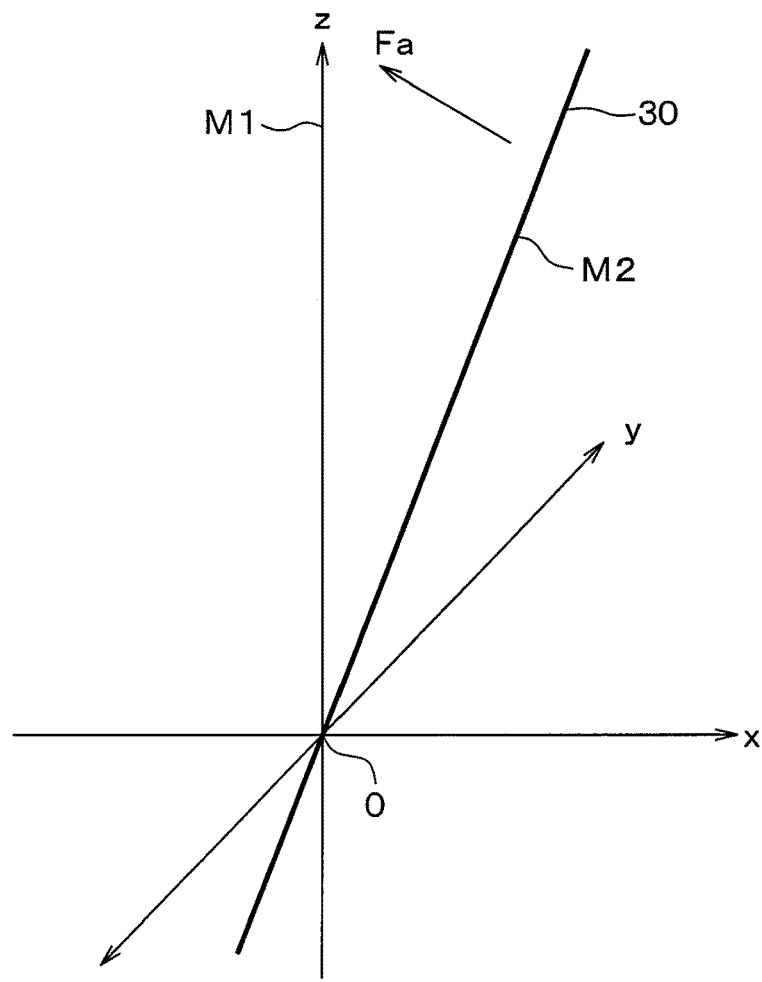
FIG. 7 is a diagram showing the inclination of the rotary shaft in an X-Y-Z coordinate system.

The center piece 31 is a supporting member including a cylindrical section 31a and a flange section 31b. The cylindrical section 31a is formed in a cylindrical shape centered on a rotation center line M1 of the rotary shaft 30. The rotation center line M1 is shown in FIG. 7. The rotary shaft 30 is positioned in a hollow section of the cylindrical section 31a.

The flange section 31b is formed so as to protrude radially outward from one side in an axial direction of the cylindrical section 31a. The center piece 31 is fixed to a plate 40. The radial direction is a radial direction centered on the rotation center line M1 of the rotary shaft 30.

The bearing 32 is a mechanical bearing that rotatably supports one side in the axial direction of the rotary shaft 30. The bearing 32 is arranged radially inward relative to the cylindrical section 31a of the center piece 31. The bearing 32 is supported by the cylindrical section 31a. The bearing 32 is supported from one side in the axial direction by a holding plate 41.

In the present embodiment, for example, a rolling bearing is used as the bearing 32. The rolling bearing is a conventional bearing formed of a raceway, which is positioned on an outer circumferential side of the rotary shaft 30, and rolling elements, which are arranged between the rotary shaft 30 and the raceway, so that the rolling bearing supports the rotary shaft 30 by rolling motion of the rolling elements.

The holding member 33 is positioned between a rotor supporting section 60a and the bearing 32 of the rotor case 60. The holding member 33 is formed in a ring shape centered on the rotation center line M1 of the rotary shaft 30.

A gap is provided between the holding member 33 and the rotary shaft 30. The holding member 33 is a bearing section for supporting the rotary shaft 30 in a state in which the rotary shaft 30 is largely inclined from the rotation center line M1 of the rotary shaft 30. The holding member 33 is supported by the cylindrical section 31a of the center piece 31. The holding member 33 of the present embodiment is formed of a resin material having lubricity.

As shown in FIG. 1, the stator 35 includes coils 50a, 50b, 50c, coils 51a, 51b, 51c, and the stator core 52.

The stator core 52 forms a magnetic path through which magnetic fluxes (that is, magnetic field) generated from the coils 50a, 50b and 50c pass. Further, the stator core 52 forms a magnetic path through which magnetic fluxes (that is, magnetic field) generated from the coils 50a, 50b and 50c pass. A stator core 52 forms a magnetic circuit together with a plurality of permanent magnets 61.

Figure 3:
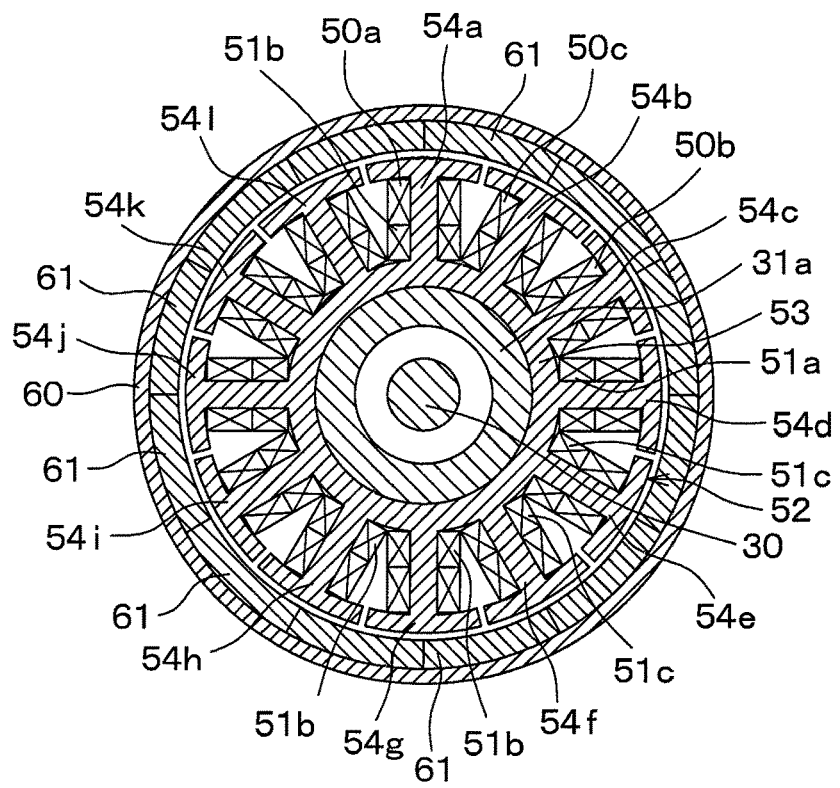
FIG. 3 is a cross-sectional view taken along line III-III in FIG. 1.

Specifically, as shown in FIG. 3, the stator core 52 includes a ring section 53 and teeth 54a, 54b, 54c, 54d, 54e, 54f, 54g, 54h, 54i, 54j, 54k, 54l. The ring section 53 is positioned radially outside relative to the cylinder section 31a of the center piece 31 around an axis line M2 of the rotary shaft 30. The ring section 53 is fixed to the cylindrical section 31a.

The teeth 54a, 54b, 54c, 54d, 54e, 54f, 54g, 54h, 54i, 54j, 54k, 54l are formed so as to protrude radially outward from the ring section 53. The teeth 54a, 54b, 54c, 54d, 54e, 54f, 54g, 54h, 54i, 54j, 54k, 54l are arranged at the same interval in the circumferential direction around the rotation center line M1 of the rotary shaft 30.

The teeth 54a, 54b, 54c, 54d, 54e, 54f, 54g, 54h, 54i, 54j, 54k, 54l are formed so that respective top end sides extend in the circumferential direction.

Figure 4:
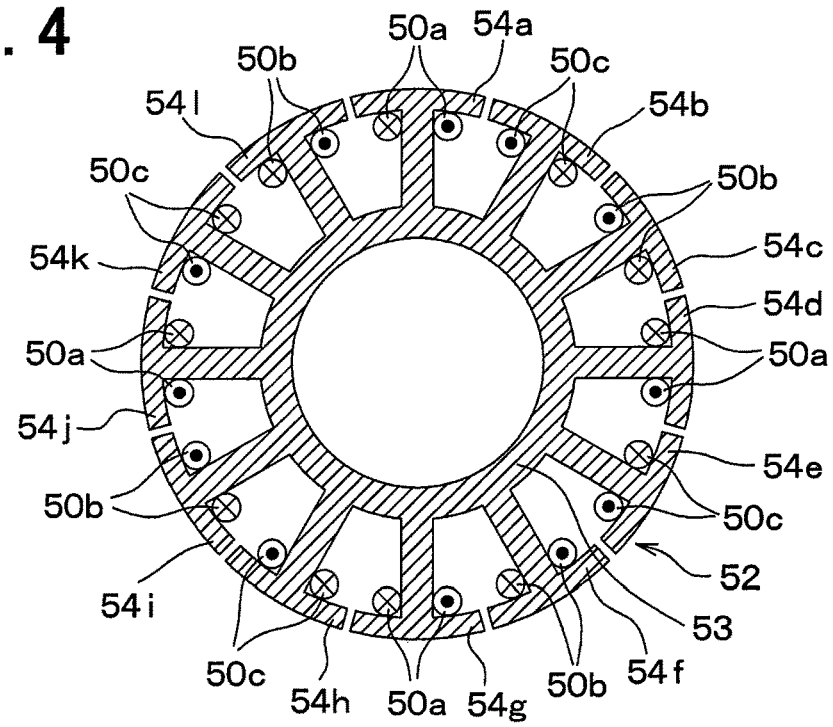
FIG. 4 is a cross-sectional view showing an arrangement of inclination control coils shown in FIG. 1.

The coils 50a, 50b, 50c of the present embodiment are tilt control coils that generate a supporting force for the rotary shaft 30. FIG. 4 shows the arrangement of the coils 50a, 50b, 50c of this embodiment.

In FIG. 4, illustration of the coils 51a, 51b, 51c is omitted for convenience of explanation. In FIG. 4, in the coils 50a, 50b, 50c, cross symbols x indicate the state in which current flows from the front side to the back side in the direction perpendicular to the drawing sheet surface, and black dots indicate the state in which current flows from the back side to the front side in the direction perpendicular to the drawing sheet surface.

The coil 50a is a U1 phase coil and is wound around the teeth 54a, 54d, 54g, 54j. The teeth 54a, 54d, 54g, 54j are arranged so as to be offset by an angle of 90 degrees in the circumferential direction centered on the rotation center line M1 of the rotary shaft 30.

The coil 50b is a V1 phase coil and is wound around the teeth 54c, 54f, 54i, 54l. The teeth 54c, 54f, 54i, 54l are positioned so as to be offset by an angle of 90 degrees in the circumferential direction around the rotation center line M1 of the rotary shaft 30.

The coil 50c is a W1 phase coil and is wound around the teeth 54b, 54e, 54h, 54k. The teeth 54b, 54e, 54h, 54k are positioned so as to be offset by an angle of 90 degrees in the circumferential direction around the rotation center line M1 of the rotary shaft 30.

The coils 50a, 50b, 50c, the stator core 52 and the permanent magnet 61 of the present embodiment form magnetic bearing that supports the rotary shaft 30 by electromagnetic action.

In the present embodiment, the coils 51a, 51b, 51c are positioned on the rotor 36 side (that is, radially outside with respect to the rotation center line M1) with respect to the coils 50a, 50b, 50c.

Figure 5:
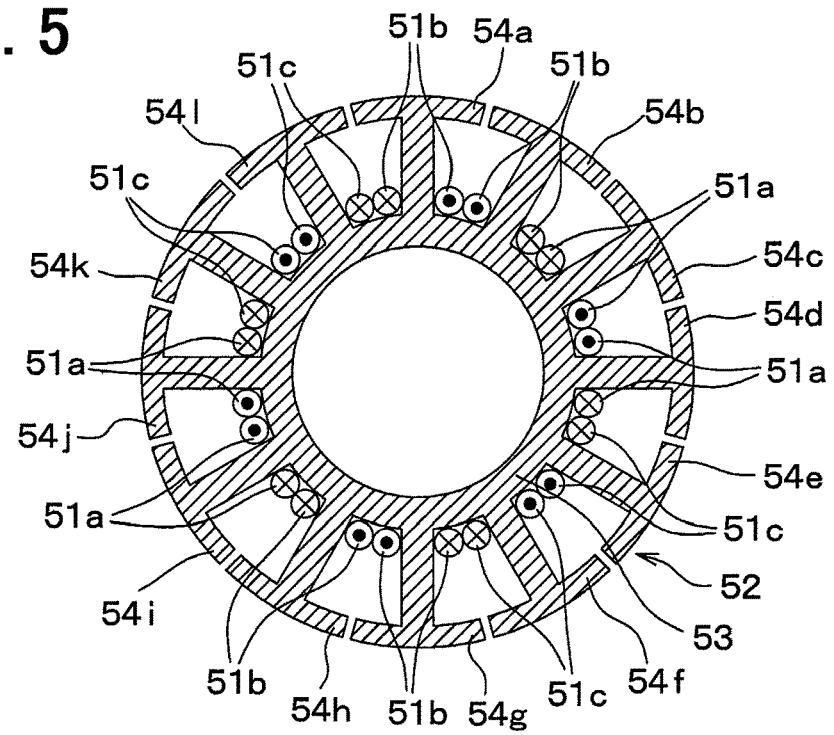
FIG. 5 is a cross-sectional view showing an arrangement of inclination control coils shown in FIG. 1.

The coils 51a, 51b, 51c of the present embodiment are rotation driving coils for generating a rotating magnetic field for rotating the rotor 36. FIG. 5 shows the arrangement of the coils 51a, 51b, 51c of this embodiment.

In FIG. 5, illustration of the coils 50a, 50b, 50c is omitted for convenience of explanation. In FIG. 5, in the coils 51a, 51b, and 51c, cross symbols x indicate the state in which current flows from the front side to the back side in the direction perpendicular to the drawing sheet surface, and black dots indicate the state in which current flows from the back side to the front side in the direction perpendicular to the drawing sheet surface.

The coil 51a is a U2 phase coil and is wound around the teeth 54c, 54d, 54i, 54j. The teeth 54c, 54i are positioned so as to be offset by an angle of 180 degrees in the circumferential direction around the rotation center line M1 of the rotary shaft 30. The teeth 54d, 54j are positioned so as to be offset by an angle of 180 degrees in the circumferential direction around the rotation center line M1 of the rotary shaft 30.

Here, the coil 50a wound around the tooth 54c and the coil 50a wound around the tooth 54d are wound in different directions. The coil 50a wound around the tooth 54i and the coil 50a wound around the tooth 54j are wound in different directions.

The coil 51b is a V2 phase coil and is wound around the teeth 54a, 54b, 54g, 54h. The teeth 54a, 54g are positioned so as to be offset by an angle of 180 degrees in the circumferential direction around the rotation center line M1 of the rotary shaft 30. The teeth 54b, 54h are positioned so as to be offset by an angle of 180 degrees in the circumferential direction around the rotation center line M1 of the rotary shaft 30.

Here, the coil 50b wound around the tooth 54a and the coil 50b wound around the tooth 54b are wound in different directions. The coil 50b wound around the tooth 54g and the coil 50b wound around the tooth 54h are wound in different directions.

The coil 50c is a W2 phase coil and is wound around the teeth 54e, 54f, 54k, 54l. The teeth 54e, 54k are positioned so as to be offset by an angle of 180 degrees in the circumferential direction around the rotation center line M1 of the rotary shaft 30. The teeth 54f, 54I are positioned so as to be offset by an angle of 180 degrees in the circumferential direction around the rotation center line M1 of the rotary shaft 30.

Here, the coil 50c wound around the tooth 54e and the coil 50c wound around the tooth 54f are wound in different directions. The coil 50c wound around the tooth 54k and the coil 50c wound around the tooth 54l are wound in different directions.

In this manner, the coils 50a, 50b, 50c and the coils 51a, 51b, 51c are wound around the stator core 52 which is common. That is, the coils 50a, 50b, 50c and the coils 51a, 51b, 51c are attached to the center piece 31 via the stator core 52. The current flowing through the coils 50a, 50b, 50c and the current flowing through the coils 51a, 51b, 51c are controlled by the control circuit 73.

As shown in FIG. 1, the rotor 36 includes a rotor case 60 and a plurality of permanent magnets 61. The rotor case 60 forms a magnetic path through which magnetic fluxes generated from the coils 51a, 51b, 51c, 50a, 50b, 50c and magnetic fluxes generated from the plurality of permanent magnets 61 pass, and a yoke formed in a cylindrical shape centered on the axis line M2 of the rotary shaft 30.

The rotor case 60 includes a rotor supporting section 60a, a lid section 60c and a side wall 60d. The lid section 60 c is formed in a disc shape having the axis line M2 as a center. The lid section 60c is arranged on the other side in the axial direction with respect to the stator 35.

The rotor supporting section 60a is formed into a cylindrical shape having a through hole 60b and projecting from the axis line M2 side to the other side in the axial direction of the cover section 60c. The axis line of the through hole 60b of the rotor supporting section 60a coincides with the axis line M2 of the rotary shaft 30. The rotor supporting section 60a is connected to the rotary shaft 30 in a state that the rotary shaft 30 passes through the through hole 60b of the rotor supporting section 60a. The rotor support section 60a is a section of the rotor 36 supported by the rotary shaft 30.

The side wall 60d is formed in a cylindrical shape centered on the axis line M2 of the rotary shaft 30. The side wall 60d protrudes from the radially outer side centered around the axis line M2 of the rotary shaft 30 to one axial side in the axial direction of the lid section 60c.

The plurality of permanent magnets 61 is arranged radially inward relative to the side wall 60d with the axis line M2 as a center. The plurality of permanent magnets 61 is arranged in the circumferential direction around the axis line M2 of the rotary shaft 30. The plurality of permanent magnets 61 is fixed to the side wall 60d.

The plurality of permanent magnets 61 forms a plurality of magnetic poles in the rotor 36. The plurality of permanent magnets 61 are arranged such that respective magnetic poles are directed radially inward with the axis line M2 as the center.

Specifically, the plurality of permanent magnets 61 is arranged such that the south pole and the north pole which are the magnetic poles are arranged alternately in the circumferential direction around the axis line M2. In the present embodiment, twelve permanent magnets 61 are arranged.

The Hall elements 37a, 37b, 37c in FIG. 2 are detection elements for detecting the magnetic flux generated from the permanent magnet 38. The Hall elements 37a, 37b, 37c are arranged in the radially inner side around the axis line M2 relative to the tubular section 31a at the other axial side of the tubular section 31a of the center piece 31.

The Hall elements 37a, 37b, 37c are supported by the cylindrical section 31a of the center piece 31. The Hall elements 37a, 37b, 37c are supported by the cylindrical section 31a of the center piece 31.

As shown in FIG. 2, the Hall elements 37a, 37b, and 37c are positioned so as to be offset by 120 degrees in the circumferential direction around the rotation center line M1 as viewed from the direction in which the rotation center line M1 extends.

As a result, the Hall elements 37a, 37b, 37c are positioned such that any two Hall elements out of the Hall elements 37a, 37b, 37c deviate from a point symmetric position centered on the rotation center line M1.

That is, the Hall elements 37a, 37b, 37c are positioned such that each imaginary line connecting any two Hall elements out of the Hall elements 37a, 37b, 37c deviates from the rotation center line M1.

Specifically, the Hall elements 37a, 37b and 37c are positioned such that the imaginary line connecting the Hall elements 37a and 37b deviates from the rotation center line M1, the imaginary line connecting the Hall elements 37a and 37c deviates from the rotation center line M1, and the imaginary line connecting the Hall elements 37b and 37c deviates from the rotation center line M1.

In the present embodiment, assuming that the coordinate in a direction in which the rotation center line M1 is the Z coordinate, the Z coordinate of the Hall element 37a, the Z coordinate of the Hall element 37b and the Z coordinate of the Hall element 37c coincide one another.

The Hall elements 37a, 37b, 37c are for calculating the rotation angle of the rotary shaft 30 and the XY coordinates of the axis line M2 of the rotary shaft 30. The Hall elements 37a, 37b, 37c of the present embodiment are formed of Hall elements for detecting the magnetic field generated by the permanent magnet 38. Since three Hall elements 37a, 37b, 37c detect the magnetic fluxes, a distance from each Hall element to the magnet is specified by using the detection result of the individual Hall element.

The permanent magnet 38 is positioned between the rotor support section 60a of the rotor case 60 and the holding member 33. As shown in FIG. 2, the permanent magnet 38 is formed in the ring shape so as to surround the rotary shaft 30 around the axis line M2, and has a pair of S pole and N pole serving as magnetic poles in the radially outward directions passing the axis line M2.

In the permanent magnet 38, the S pole and the N pole are arranged in the circumferential direction around the axis line M2. The S pole and the N pole are each formed in a half-moon shape and arranged with an offset of 180 degrees around the rotation center line M1.

Figure 6:
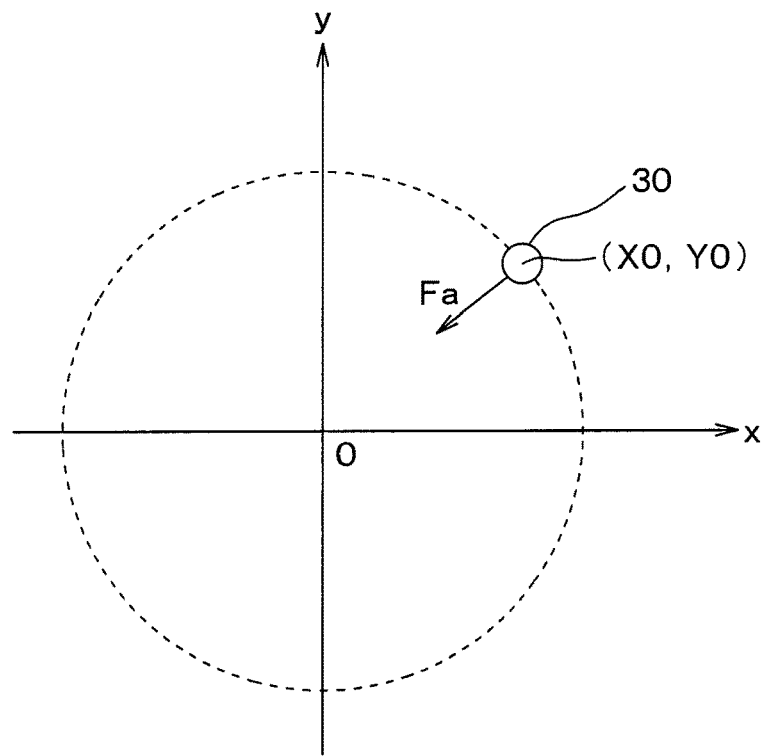
FIG. 6 is a diagram showing an inclination of a rotary shaft in an X-Y coordinate system.

As shown in FIG. 6 and FIG. 7, the electric motor 10 is configured such that the axis line M2 of the rotary shaft 30 is able to incline from the rotation center line M1 of the rotary shaft 30 with a fulcrum point at the bearing 32 side of the rotary shaft 30.

FIG. 6 shows one example, in which the rotary shaft 30 is inclined by an angle θ relative to the Z axis, assuming that the fulcrum point is a point of origin 0, the rotation center line M1 of the rotary shaft 30 is the Z axis and the axes orthogonal to the rotation center line M1 are X axis and the Y axis. In FIG. 6, (X0, Y0) indicates the X-Y coordinates of the other axial end section of the axis line M2 of the rotary shaft 30.

Hereinafter, an electric configuration of the electric motor system 1 according to the present embodiment will be described.

Figure 8:
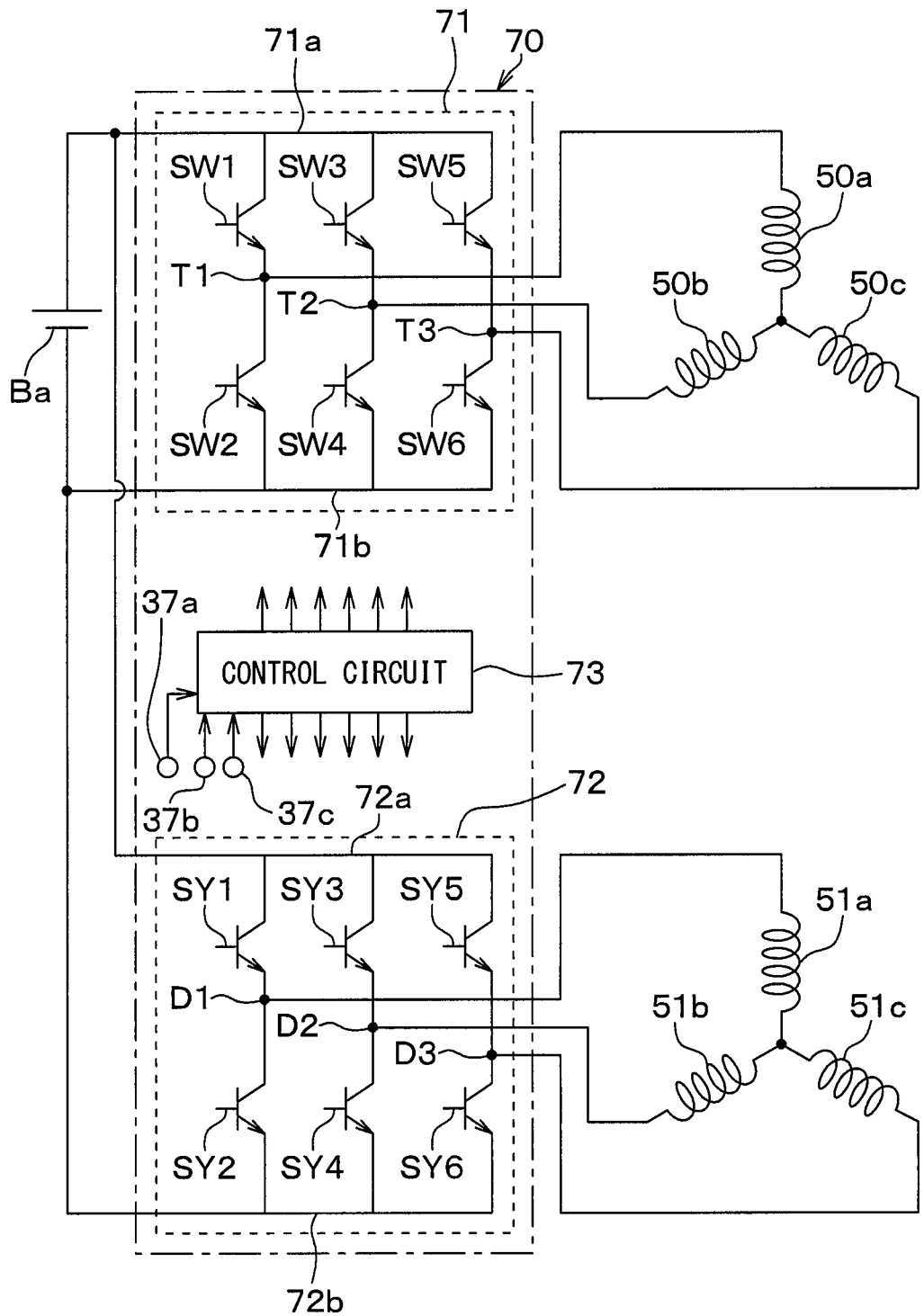
FIG. 8 is an electric circuit diagram showing an electric circuit configuration of a control circuit shown in FIG. 1.

As shown in FIG. 8, an electronic control unit 70 includes inverter circuits 71, 72 and a control circuit 73.

The inverter circuit 71 includes transistors SW1, SW2, SW3, SW4, SW5, SW6.

The transistors SW1 and SW2 are connected in series between a positive bus 71a and a negative bus 71b. The transistors SW3 and SW4 are connected in series between the positive bus 71a and the negative bus 71b. The transistors SW5 and SW6 are connected in series between the positive bus 71a and the negative bus 71b.

A common connection terminal T1 between the transistors SW1 and SW2 is connected to the coil 50a. A common connection terminal T2 between the transistors SW3 and SW4 is connected to the coil 50b. A common connection terminal T3 between the transistors SW5 and SW6 is connected to the coil 50c. The coils 50a, 50b and 50c are connected in a star connection form.

The inverter circuit 72 includes transistors SY1, SY2, SY3, SY4, SY5, SY6.

The transistors SY1 and SY2 are connected in series between a positive bus 72a and a negative bus 72b. The transistors SY3 and SY4 are connected in series between the positive bus 72a and the negative bus 72b. The transistors SY5 and SY6 are connected in series between the positive bus 72a and the negative bus 72b.

A common connection terminal D1 between the transistors SY1 and SY2 is connected to the coil 51a. A common connection terminal D2 between the transistors SY3 and SY4 is connected to the coil 51b. A common connection terminal D3 between the transistors SY5 and SY6 is connected to the coil 51c. The coils 51a, 51b and 51c are connected in a star connection form. The positive buses 71a and 72a are connected to a positive electrode of a DC power supply Ba. The negative buses 71b and 72b are connected to a negative electrode of the DC power supply Ba.

The control circuit 73 is configured in a microcomputer, a memory and the like. Based on a computer program stored in the memory, the control circuit 73 executes control processing for generating a rotational force in the rotor 36 and outputting a supporting force for supporting the rotary shaft 30. By execution of the control processing, the control circuit 73 A/D-converts the output signals of the Hall elements 37a, 37b, 37c into digital signals and controls switching of the transistors SW1, SW2, SW3, SW4, SW5, SW6 and the transistors SY1, SY2, SY3, SY4, SY5, SY6 based on the digital signals. The memory is a non-transitional physical storage medium.

Hereinafter, in order to distinguish the output signals and the digital signals of the Hall elements 37a, 37b, 37c, the output signal of the Hall element 37a is referred to as the output signal ha and the digital signal outputted by A/D-converting the output signal ha is referred to as the digital signal ha. The output signal of the Hall element 37b is referred to as the output signal hb and the digital signal outputted by A/D-converting the output signal hb is referred to as the digital signal hb. The output signal of the Hall element 37c is referred to as the output signal hc and the digital signal outputted by A/D-converting the output signal hc is referred to as the digital signal hc.

Figure 9:
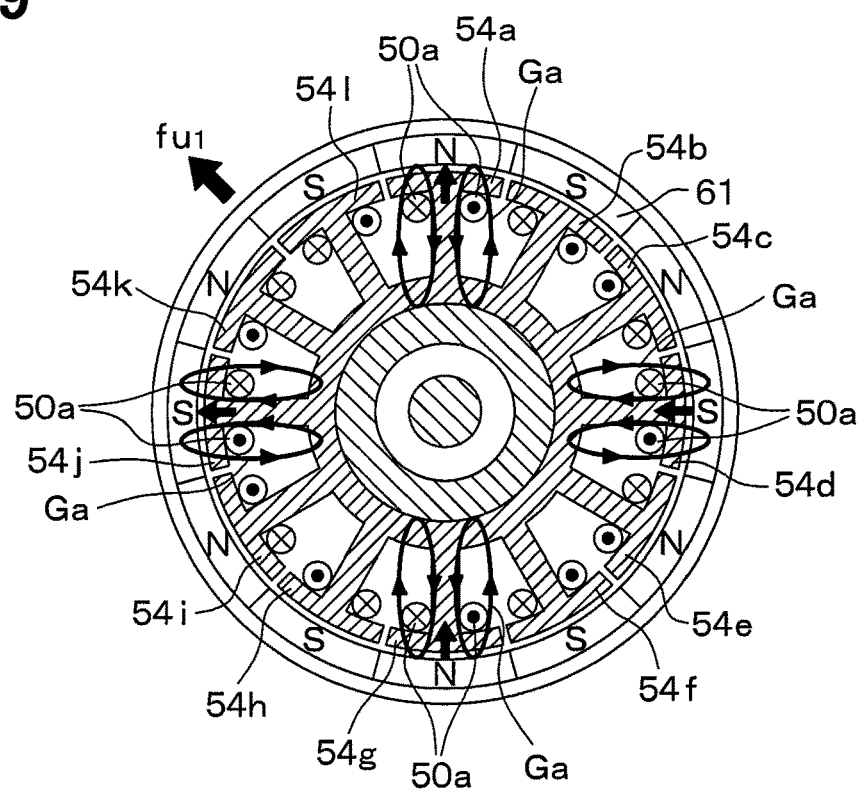
FIG. 9 is a diagram showing an electromagnetic force generated by an inclination control u1 phase coil.

When a current is supplied from the common connection terminal T1, T2, T3 to the coil 50a, a repulsive force and an attractive force are generated as an electromagnetic force between the coil 50a and the plurality of magnetic poles (that is, the permanent magnet 61) as shown in FIG. 9 based on the magnetic fluxes Ga generated by the plurality of permanent magnets 61.

Specifically, the repulsive force and the attractive force are generated as the electromagnetic force between the coil 50a wound around the teeth 54a, 54d, 54g, 54j and the plurality of permanent magnets 61. The repulsive force and the attractive force generated between the coil 50a and the plurality of permanent magnets 61 are combined and an electromagnetic force fu1 is generated. The electromagnetic force fu1 is a force for moving the rotor 36 in a first direction. The first direction is a direction rotated 225 degrees in a clockwise direction from the X axis assuming that the axis extending to the right side of the drawing sheet from the axis line of the rotary shaft 30 is the X axis.

Figure 10:
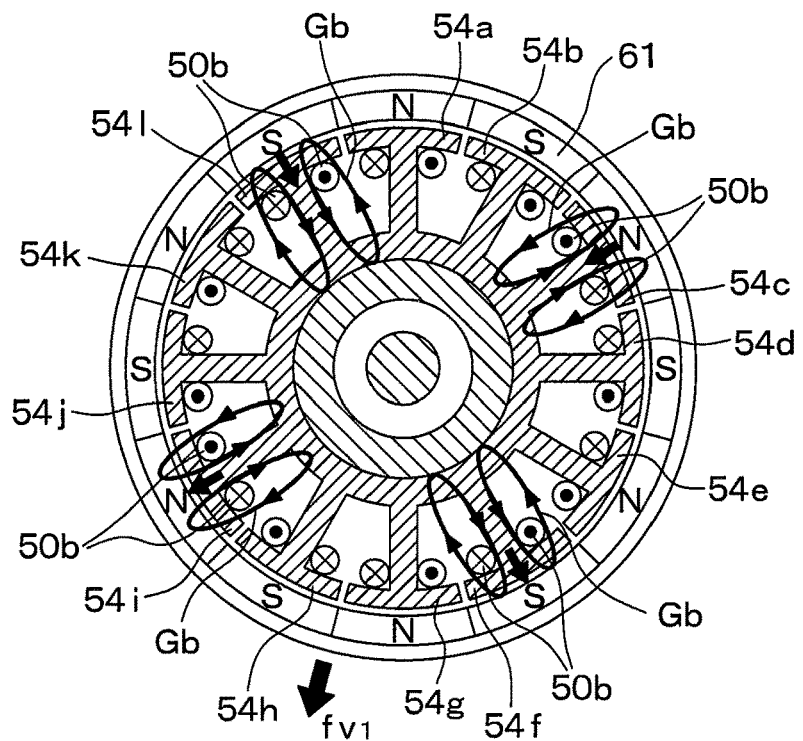
FIG. 10 is a diagram showing an electromagnetic force generated by an inclination control v1 phase coil.
Figure 11:
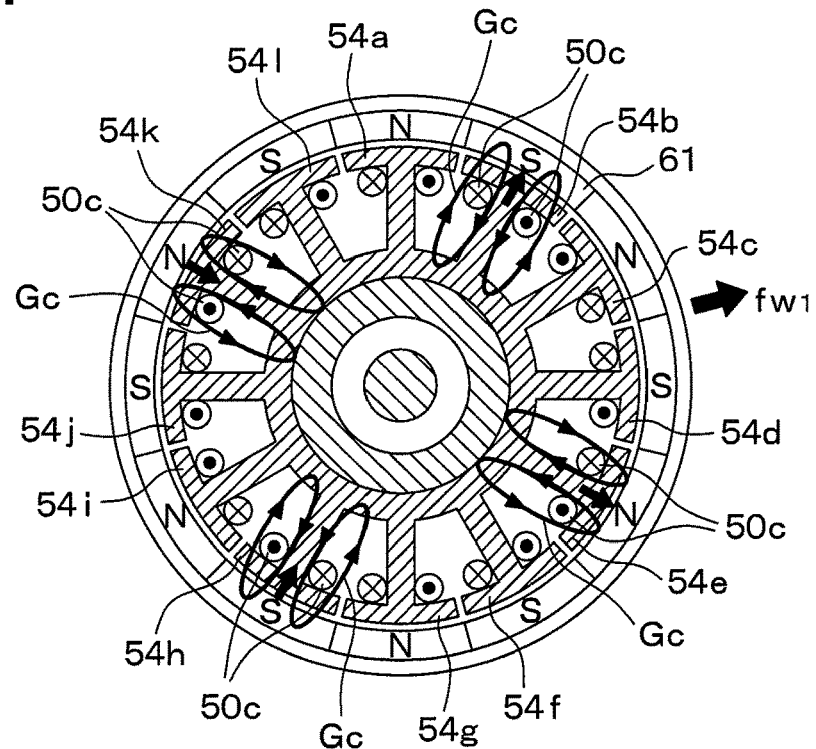
FIG. 11 is a diagram showing an electromagnetic force generated by an inclination control w1 phase coil.
Figure 12:
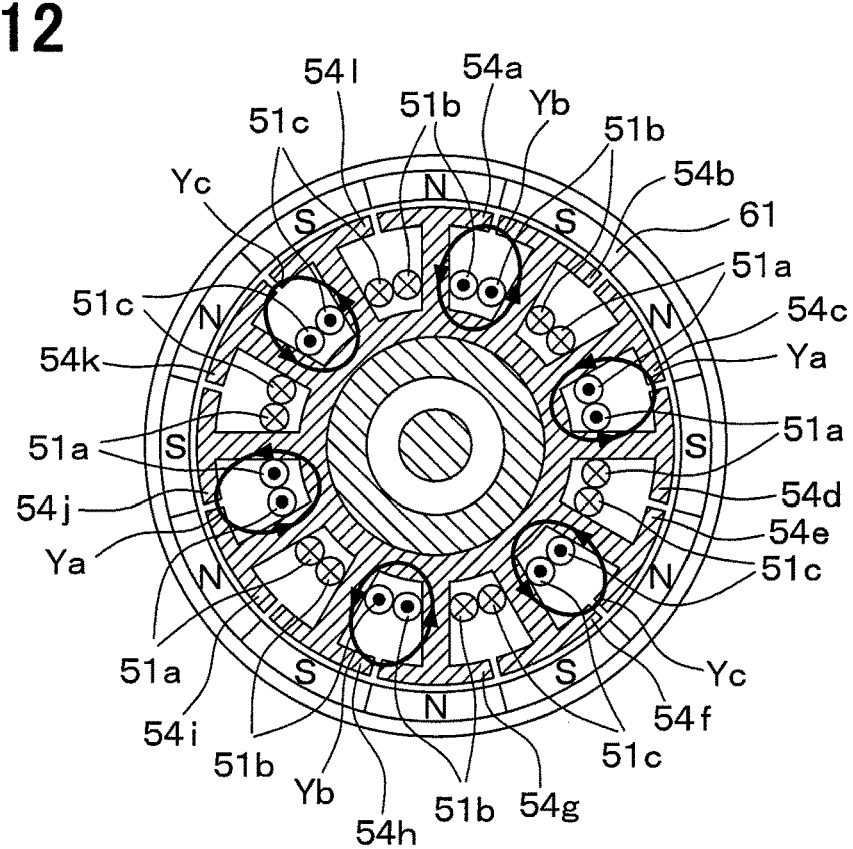
FIG. 12 is a diagram showing an electromagnetic force generated by a rotation control coil.

In FIG. 9, FIG. 10, and FIG. 11, each arrow pointing outward in the radial direction indicates the repulsive force and each arrow pointing inward in the radial direction indicates the attractive force.

When a current is supplied from the common connection terminals T1, T2, T3 to the coil 50b, a repulsive force and an attractive force are generated as an electromagnetic force between the coil 50b and the plurality of magnetic poles as shown in FIG. 10 based on the magnetic fluxes Gb generated by the plurality of permanent magnets 61.

Specifically, the repulsive force and the attractive force are generated as the electromagnetic force between the coil 50b wound around the teeth 54c, 54f, 54i, 54l and the plurality of permanent magnets 61. The repulsive force and the attractive force generated between the coil 50b and the plurality of permanent magnets 61 are combined and an electromagnetic force fv1 is generated. The electromagnetic force fv1 is a force for moving the rotor 36 in a second direction. The second direction is a direction rotated by 105 degrees in the clockwise direction from the X axis.

When a current is output from the common connection terminals T1, T2, T3 to the coil 50c, a repulsive force and an attractive force are generated as an electromagnetic force between the coil 50c and the plurality of magnetic poles as shown in FIG. 11 based on the magnetic fluxes Gc generated by the plurality of permanent magnets 61.

Specifically, the repulsive force and the attractive force are generated as the electromagnetic force between the coil 50c wound around the teeth 54b, 54e, 54h, 54k and the plurality of permanent magnets 61. The repulsive force and the attractive force generated between the coil 50c and the plurality of permanent magnets 61 are combined and an electromagnetic force fw1 is generated. The electromagnetic force fw1 is a force for moving the rotor 36 in a third direction. The third direction is a direction rotated by 15 degrees in a counter-clockwise direction from the X axis.

Here, the direction of the electromagnetic force fu1, the direction of the electromagnetic force fv1 and the direction of the electromagnetic force fw1 are arranged at a same angular interval in the circumferential direction around the rotation center line M1 of the rotary shaft 30.

Specifically, the direction of the electromagnetic force fu1 is offset by an angle of 120 degrees relative to the direction of the electromagnetic force fv1. The direction of the electromagnetic force fv1 is offset by an angle of 120 degrees relative to the direction of the electromagnetic force fw1. The direction of the electromagnetic force fw1 is offset by an angle of 120 degrees relative to the direction of the electromagnetic force fu1. Here, the electromagnetic forces fu1, fv1, fw1 are referred to as unit vectors, respectively.

Figure 13:
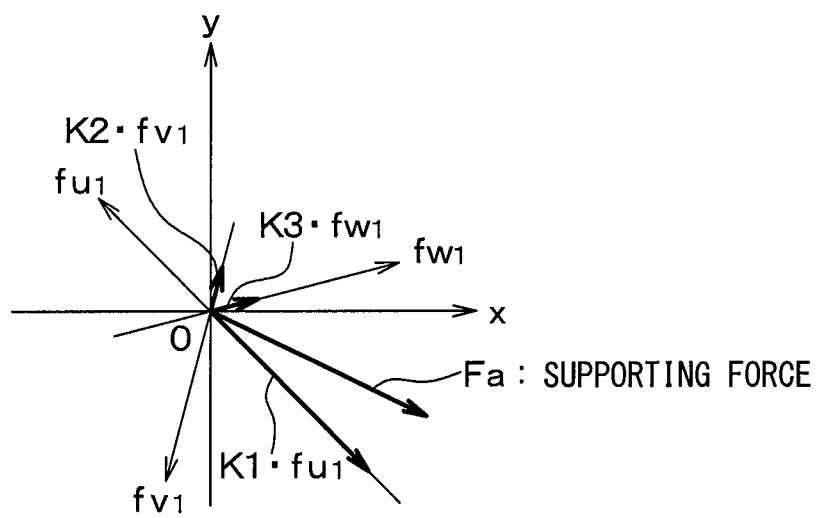
FIG. 13 is a diagram showing a supporting force generated by the inclination control coil.

Using the electromagnetic forces fu1, fv1, fw1 and coefficients K1, K2, K3 multiplied to the electromagnetic forces fu1, fv1, fw1, respectively, a supporting force Fa for bringing the axis line M2 of the rotary shaft 30 closer to the rotational center line M1 is expressed by the following equation 1 in reference to FIG. 13. The axis line M2 is shown in FIG. 8.

$$Fa = K1 \cdot fu1 + K2 \cdot fv1 + K3 \cdot fw1 \quad \text{(Equation 1)}$$

The control circuit 73 controls the transistors SW1, SW2, SW3, SW4, SW5, SW6 thereby to control the currents supplied from the common connection terminals T1, T2, T3 to the coils 50a, 50b, 50c. Therefore, by controlling coefficients K1, K2, K3, it is possible to control the magnitude and the direction of the supporting force Fa, respectively.

The control circuit 73 controls the transistors SY1, SY2, SY3, SY4, SY5, SY6 thereby to output currents from the common connection terminals D1, D2, D3 to the coils 51a, 51b, 51c. For this reason, as shown in FIG. 13, the rotating magnetic fields Ya, Yb, Yc are sequentially generated from the coils 51a, 51b, 51c. The rotating magnetic fields Ya, Yb, Yc generate rotational force in the plurality of permanent magnets 61.

The rotating magnetic field Ya is generated from the coil 51a positioned between the teeth 54c and 54d and the coil 51a positioned between the teeth 54i and 54j. The rotating magnetic field Yb is generated from the coil 51b positioned between the teeth 54g and 54h and the coil 51b positioned between the teeth 54a and 54b. The rotating magnetic field Yc is generated from the coil 51c positioned between the teeth 54e and 54f and the coil 51c positioned between the teeth 54k and 54l.

Next, an operation of the electric motor system 1 of the present embodiment will be described.

Before describing the control processing of the control circuit 73, the operation of the electric motor system 1 will be outlined below with reference to FIG. 14.

Figure 14:
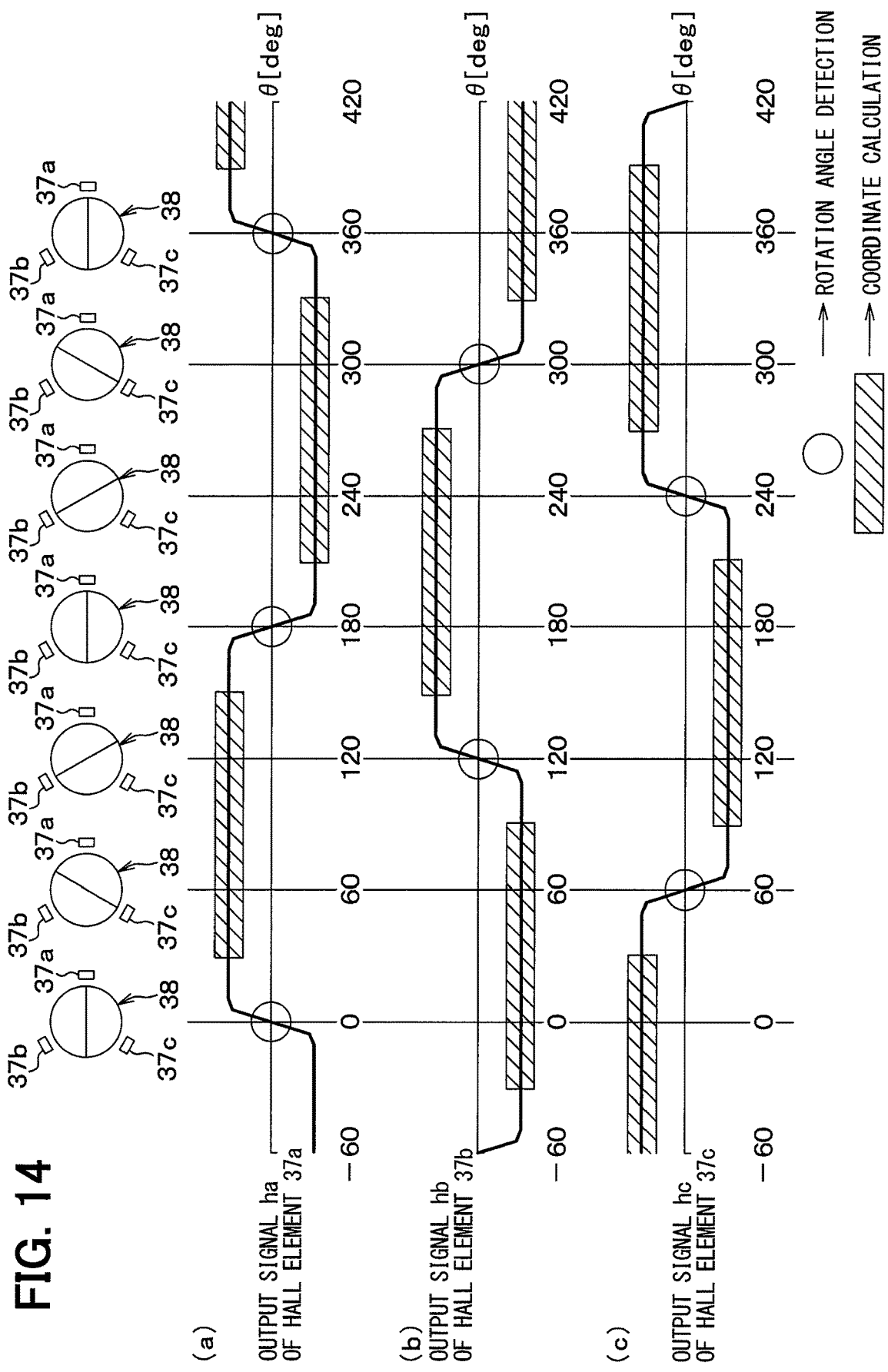
FIG. 14 is a diagram showing a relationship between an output signal of a Hall element and a rotation angle of a rotary shaft.

First, when the rotor 36 rotates in a counterclockwise direction in FIG. 14, the output signal ha of the Hall element 37a changes in order of positive value→negative value→positive value→negative value, the output signal hb of the Hall element 37b changes in order of negative value→positive value→negative value→positive value, and the output signal hc of the Hall element 37c changes in order of positive value→negative value→positive value→negative value→positive value.

For example, when the rotation angle θ of the rotor 36 becomes zero degree, a boundary (hereinafter also referred to as magnetic pole boundary) between the S pole and the N pole of the permanent magnet 38 reaches the angle at which the Hall element 37a is positioned. Therefore, the magnetic flux passing through the Hall element 37a becomes zero and the output signal ha of the Hall element 37a becomes zero.

Next, when the rotation angle θ of the rotor 36 reaches 60 degrees, the magnetic pole boundary of the permanent magnet 38 reaches an angle at which the Hall element 37c is positioned. Therefore, the magnetic flux passing through the Hall element 37c becomes zero and the output signal hc of the Hall element 37c becomes zero.

Next, when the rotation angle θ of the rotor 36 reaches 120 degrees, the magnetic pole boundary of the permanent magnet 38 reaches an angle at which the Hall element 37b is positioned. Therefore, the magnetic flux passing through the Hall element 37b becomes zero and the output signal hb of the Hall element 37b becomes zero.

Next, when the rotation angle θ of the rotor 36 reaches 180 degrees, the magnetic pole boundary of the permanent magnet 38 reaches an angle at which the Hall element 37a is positioned. Therefore, the magnetic flux passing through the Hall element 37a becomes zero and the output signal ha of the Hall element 37a becomes zero.

Next, when the rotation angle θ of the rotor 36 reaches 240 degrees, the magnetic pole boundary of the permanent magnet 38 reaches an angle at which the Hall element 37b is positioned. Therefore, the magnetic flux passing through the Hall element 37c becomes zero and the output signal hc of the Hall element 37c becomes zero.

Next, when the rotation angle θ of the rotor 36 reaches 300 degrees, the magnetic pole boundary of the permanent magnet 38 reaches an angle at which the Hall element 37c is positioned. Therefore, the magnetic flux passing through the Hall element 37b becomes zero and the output signal hb of the Hall element 37b becomes zero.

Next, when the rotation angle θ of the rotor 36 reaches 0 degree (that is, 360 degrees), the magnetic pole boundary of the permanent magnet 38 reaches an angle at which the Hall element 37a is positioned. Therefore, the magnetic flux passing through the Hall element 37a becomes zero and the output signal ha of the Hall element 37a becomes zero.

Next, the control processing of the control circuit 73 will be described with reference to FIG. 15 to FIG. 19.

The control circuit 73 executes the control processing according to flowcharts of FIG. 15 to FIG. 19.

Figure 15:
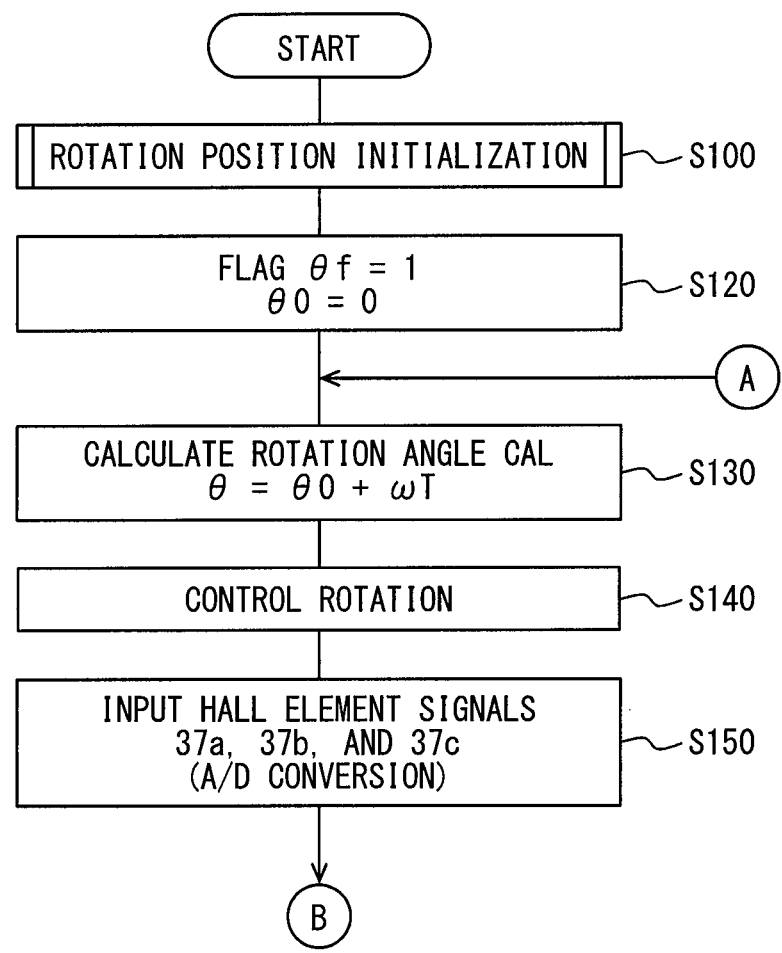
FIG. 15 is a flowchart showing a part of control processing of the control circuit shown in FIG. 1.
Figure 16:
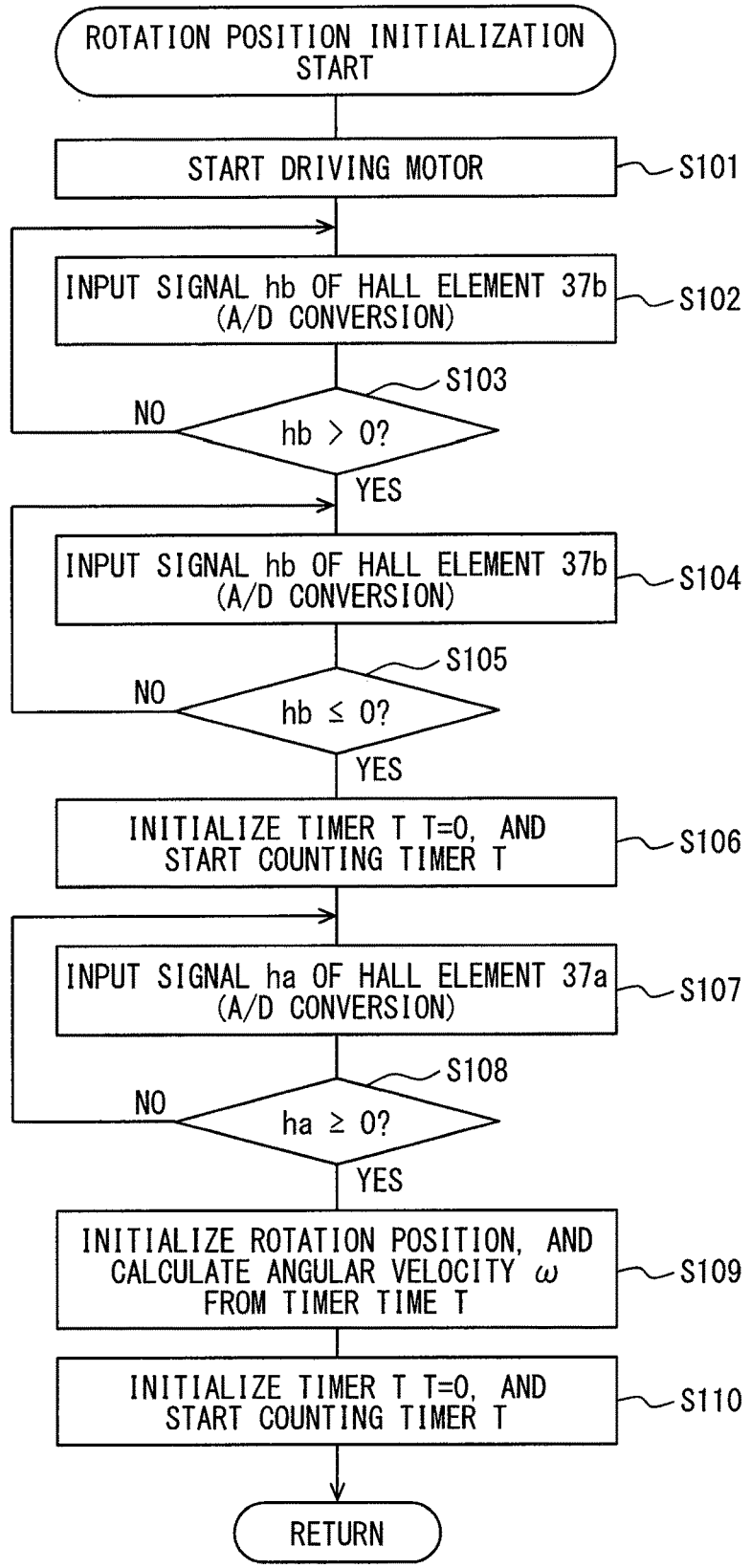
FIG. 16 is a flowchart showing details of step 100 which is a part of the flowchart of FIG. 15.

First, in step 100 of FIG. 15, the control circuit 73 initializes the rotation angle θ of the rotary shaft 30.

Specifically, in step 101, the control circuit 73 starts driving the electric motor 10. More specifically, the control circuit 73 performs switching control of the transistors SY1, SY2, SY3, SY4, SY5, SY6.

As a result, the transistors SY1, SY2, SY3, SY4, SY5, SY6 of the inverter circuit 71 are switched over to output a three-phase alternating current from the common connection terminals D1, D2, D3 to the coils.

For this reason, the rotating magnetic fields Ya, Yb, Yc are generated from the coils 51a, 51b, 51c. As a result, a rotational force rotating synchronously with the rotating magnetic field is generated in the plurality of permanent magnets 61. With this rotational force, the rotary shaft 30 rotates together with the rotor 36.

Next, in step 102, the control circuit 73 analog-digital converts the output signal hb of the Hall element 37b into the digital signal hb. Based on the digital signal hb, the control circuit 73 determines in step S103 whether the output signal hb of the Hall element 37b is larger than zero.

At this time, when the output signal hb of the hall element 37b is equal to or smaller than zero, that is, when hb≤0, a determination result in step 103 is NO. Next, returning to step 102, the control circuit 73 analog-digital converts the output signal hb of the Hall element 37b into the digital signal hb. Based on the digital signal hb, the control circuit 73 determines in step S103 whether the output signal hb of the Hall element 37b is larger than zero.

Therefore, when the state in which the output signal hb of the Hall element 37b is smaller than or equal to zero continues, the processing of step 102 and the determination of NO of step 103 are repeatedly executed. Thereafter, when the output signal hb of the Hall element 37b becomes larger than zero, that is, hb>0, the control circuit 73 determines YES in step 103.

Next, in step 104, the control circuit 73 analog-digital converts the output signal hb of the Hall element 37b into the digital signal hb. Based on the digital signal hb, the control circuit 73 determines whether the output signal hb of the Hall element 37b is smaller than zero.

At this time, when the output signal hb of the Hall element 37b is larger than zero, that is, hb>0, a determination result in step 105 is NO. Accordingly, the processing returns to step 104.

Therefore, when the state in which the output signal hb of the Hall element 37b is larger than zero continues, the processing of step 104 and the determination of NO of step 105 are repeatedly executed. Thereafter, when the output signal hb of the Hall element 37b becomes smaller than zero, that is, hb≤0, the control circuit 73 determines YES in step 105.

Next, in step 106, the control circuit 73 initializes a count time T of a timer and starts counting time T by a timer. The timer measures time of elapse after determination of YES as count time T after step 105.

Next, in step 102, the control circuit 73 analog-digital converts the output signal hb of the Hall element 37a into the digital signal ha. Based on the digital signal ha, the control circuit 73 determines in step S108 whether the output signal ha of the Hall element 37a is equal to or larger than zero.

At this time, when the output signal ha of the Hall element 37b is smaller than zero, that is, ha<0, the control circuit 73 determines NO in step 108 and returns to step 107.

Therefore, when the state in which the output signal ha of the Hall element 37a is smaller than zero continues, the processing of step 102 and the determination of NO of step 108 are repeatedly executed. Thereafter, when the output signal ha of the Hall element 37a becomes smaller than zero, that is, ha=0, the control circuit 73 determines YES in step 108.

Next, in step 109, the control circuit 73 initializes the rotation angle θ of the rotary shaft 30 to the rotation angle θ=0. That is, the rotation angle θ of the rotary shaft 30 at which the output signal ha of the Hall element 37a becomes zero is set to 0 degrees.

In addition to this, the control circuit 73 calculates an angular velocity ω of the rotary shaft 30 based on count time T of a timer as follows.

The count time T of the timer is time required for the control circuit 73 to determine YES in step 108 after determining YES in step 105. The rotary shaft 30 is rotated by 60 degrees from when the control circuit 73 determined YES in step 105 until when it determines YES in step 108.

As a result, the control circuit 73 can calculate the angular velocity ω of the rotary shaft 30 from the rotation angle 60 degrees of the rotary shaft 30 and the count time T of the timer.

Next, in step 110, the control circuit 73 initializes the count time T of the timer and starts counting the time T by the timer. The timer measures time of elapse after determination of YES as the count time T after step 108.

Next, in step 120, the control circuit 73 sets a flag θf to θf=1 and sets the initial value θ0 of the rotation angle θ of the rotary shaft 30 to zero. That is, θ0=0. In addition, the control circuit 73 substitutes the count time T of the timer, the initial value θ0 (that is, 0), and the angular velocity ω of the rotary shaft 30 for the following equation 1 in step 130 (that is, rotation angle detection section) thereby to determine the rotation angle θ of the rotary shaft 30.

$$\theta = \theta 0 + \omega \times T \qquad \text{(Equation 1)}$$

Here, the count time T of the timer is the time of elapse after the determination of YES in step 108.

Next, in step 140, the control circuit 73 executes rotation control based on the rotation angle θ of the rotary shaft 30 calculated in step 130.

Specifically, the control circuit 73 selects the coils to be excited out of the coils 51a, 51b, 51c based on the rotation angle θ of the rotary shaft 30. The control circuit 73 performs switching control of the transistors SY1, SY2, SY3, SY4, SY5, SY6 thereby to supply currents to the selected coils.

As a result, the transistors SY1, SY2, SY3, SY4, SY5, SY6 of the inverter circuit 71 are switched over to output the currents from the common connection terminals D1, D2, D3 to the selected coils.

For this reason, the rotating magnetic fields Ya, Yb, Yc are generated from the coils 51a, 51b, 51c, respectively. As a result, the rotational force rotating synchronously with the rotating magnetic field is generated in the plurality of permanent magnets 61. With this rotational force, the rotary shaft 30 rotates together with the rotor 36.

Next, in step 150, the control circuit 73 analog-digital converts the output signals ha, hb, hc of the Hall elements 37a, 37b, 37c into the digital signals ha, hb, hc, respectively.

Next, in step 160, the control circuit 73 determines based on the digital signal ha whether the output signal ha of the Hall element 37a is smaller than zero.

At this time, the output signal ha of the Hall element 37a becomes equal to or larger than zero (that is, ha≥0) and the determination in step 160 results in NO.

Next, in step 162, the control circuit 73 determines whether or not the rotation angle θ calculated in step 130 satisfies one of the following conditions (a) and (b).

(a) The rotation angle θ of the rotary shaft 30 is larger than 330 degrees.

(b) The rotation angle θ of the rotary shaft 30 is larger than 30 degrees.

At this time, the rotation angle θ of the rotary shaft 30 becomes smaller than 30 degrees and satisfies the condition (b). The determination in step 162 results in YES.

Next, the control circuit 73 determines the XY coordinates (X0, Y0) of the axis line M2 of the rotary shaft 30 on the basis of the digital signals hb and hc in step 163 (that is, coordinate detection section).

The XY coordinates (X0, Y0) of the axis line M2 of the rotary shaft 30 of the present embodiment are the XY coordinates of the axis line M2 at the other end section of the rotary shaft 30 in the axial direction. The XY coordinates are formed of Y axis and X axis, which are orthogonal to the rotation center line M1 and also orthogonal to each other. The rotation center line M1 is the Z axis.

Next, in step 164 (that is, control section), the control circuit 73 performs supporting control for bringing the axis line M2 of the rotary shaft 30 closer to the rotation center line M1 based on the XY coordinates (X0, Y0) of the axis line M2 of the rotary shaft 30. Details of the calculation process for determining the XY coordinates (X0, Y0) of the axis line M2 of the rotary shaft 30 and details of the supporting control for bringing the axis line M2 of the rotary shaft 30 closer to the rotation center line M1 will be described later.

Next, in step 165, the control circuit 73 determines whether or not each of the following conditions (c) and (d) is satisfied.

(c) The flag θf is "1."

(d) The output signal ha of the Hall element 37a is zero or larger than zero.

At this time, the output signal ha of the Hall element 37a is equal to or larger than zero. However, since the flag θ is "0" and the condition of (c) is not satisfied, the determination in step 165 results in NO.

Thereafter, in step 130 of FIG. 15, the control circuit 73 substitutes the count time T of the timer, the initial value θ0 (that is, 0) and the angular velocity ω of the rotary shaft 30 for the equation 1 thereby to calculate the rotation angle θ of the rotary shaft 30.

Next, in step 140, the control circuit 73 executes rotation control based on the rotation angle θ of the rotary shaft 30 calculated in step 120.

Next, in step 150, the control circuit 73 analog-digital converts the output signals ha, hb, hc of the Hall elements 37a, 37b, 37c, respectively.

Thereafter, the control circuit 73 repeats execution of determination of NO in step 160, determination of YES in step 162, steps 163, 164, determination of NO in step 165, and steps 130, 140, 150.

Thereafter, when the rotation angle θ of the rotary shaft 30 becomes 30 degrees or larger, the control circuit 73 determines NO in step 162.

Next, in step 170, the control circuit 73 determines whether or not the output signal hc of the Hall element 37c is larger than zero based on the digital signal hc determined in step 150 described above.

At this time, the output signal hc of the Hall element 37c becomes equal to or larger than zero (that is, hc>0), and a determination in step 170 results in YES.

Next, in step 171, the control circuit 73 sets the flag θf to θf=1 in order to store that the output signal hc of the Hall element 37c is equal to or larger than zero.

Next, in step 172, the control circuit 73 determines whether the rotation angle calculated in step 130 is equal to or smaller than 90 degrees.

At this time, the rotation angle θ of the rotary shaft 30 becomes equal to or smaller than 90 degrees and a determination in step 172 results in YES.

Next, the control circuit 73 determines the XY coordinates (X0, Y0) of the axis line M2 of the rotary shaft 30 on the basis of the digital signals ha and hb in step 173 (that is, coordinate detection section).

Next, in step 174 (that is, control section), the control circuit 73 performs the supporting control for bringing the axis line M2 of the rotary shaft 30 closer to the rotation center line M1 based on the XY coordinates (X0, Y0) of the axis line M2 of the rotary shaft 30.

Next, in step 175, the control circuit 73 determines whether or not each of the following conditions (e) and (f) is satisfied.

(e) The flag θf is "1."

(f) The output signal ha of the Hall element 37a is zero or smaller than zero.

At this time, although the flag θf is "1," the output signal hc of the Hall element 37c is larger than zero. Therefore, by determining that the condition of (f) is not satisfied, the determination result in step 175 is NO.

Thereafter, the control circuit 73 repeats the processing of steps 130, 140, 150, determination of NO in step 160, determination of YES in step 162, determination of YES in step 170, step 171, determination of YES in step 172, steps 173, 174 and determination of NO in step 175.

Thereafter, when the rotation angle θ of the rotary shaft 30 reaches 60 degrees, the output signal hc of the Hall element 37c becomes zero (that is, hc=0), and the control circuit 73 determines YES in step 175.

As a result, it is determined that the rotation angle θ of the rotary shaft 30 is 60 degrees.

Next, in step 176, the control circuit 73 resets the flag θf to θf=0 and increments the initial value θ0 of the rotation angle θ of the rotary shaft 30 by 60 degrees. That is, θ0=θ0+60 degrees.

In addition to this, the control circuit 73 calculates the angular velocity ω of the rotary shaft 30 based on the count time T of the timer as follows in step 177.

Specifically, the period from time of determination of YES in step 108 in response to the change of the output signal ha of the Hall element 37a from the negative value to the positive value to time of determination of YES in step 175 in response to the change of the output signal hc of the Hall element 37c from the positive value to the negative value is calculated as the timer count time T.

In this case, in the period from the determination of YES in step 108 in response to the change of the output signal ha of the Hall element 37a from the negative value to the positive value to the determination of YES in step 175 in response to the change of the output signal hc of the Hall element 37c from the positive value to the negative value, the rotary shaft 30 rotates 60 degrees.

As a result, the control circuit 73 can calculate the angular velocity ω of the rotary shaft 30 from the rotation angle 60 degrees of the rotary shaft 30 and the count time T of the timer. The calculated angular velocity ω is used to calculate the rotation angle in step 130.

In addition, in step 177, the control circuit 73 reinitializes the count time T of the timer and starts counting the time T by the timer. The timer measures the time of elapse after determination of YES in step 175 as the count time T.

Thereafter, the control circuit 73 executes the processing of steps 130, 140, 150, determination of NO in step 160, determination of YES in step 162, determination of NO in step 170, determination of YES in step 172 and steps 173, 174.

Next, although the output signal hc of the Hall element 37c is smaller than zero, the control circuit 73 determines NO in step 175 because the flag θf is "0" and the condition (e) is not satisfied.

Thereafter, the control circuit 73 repeatedly executes the processing of steps 130, 140, 150, determination of NO in step 160, determination of YES in step 162, determination of YES in step 170, determination of YES in step 170, determination of YES in step 172, steps 173, 174 and determination of NO in step 175.

Thereafter, when the rotation angle θ of the rotary shaft 30 becomes larger than 90 degrees, the control circuit 73 determines NO in step 172.

Figure 18:
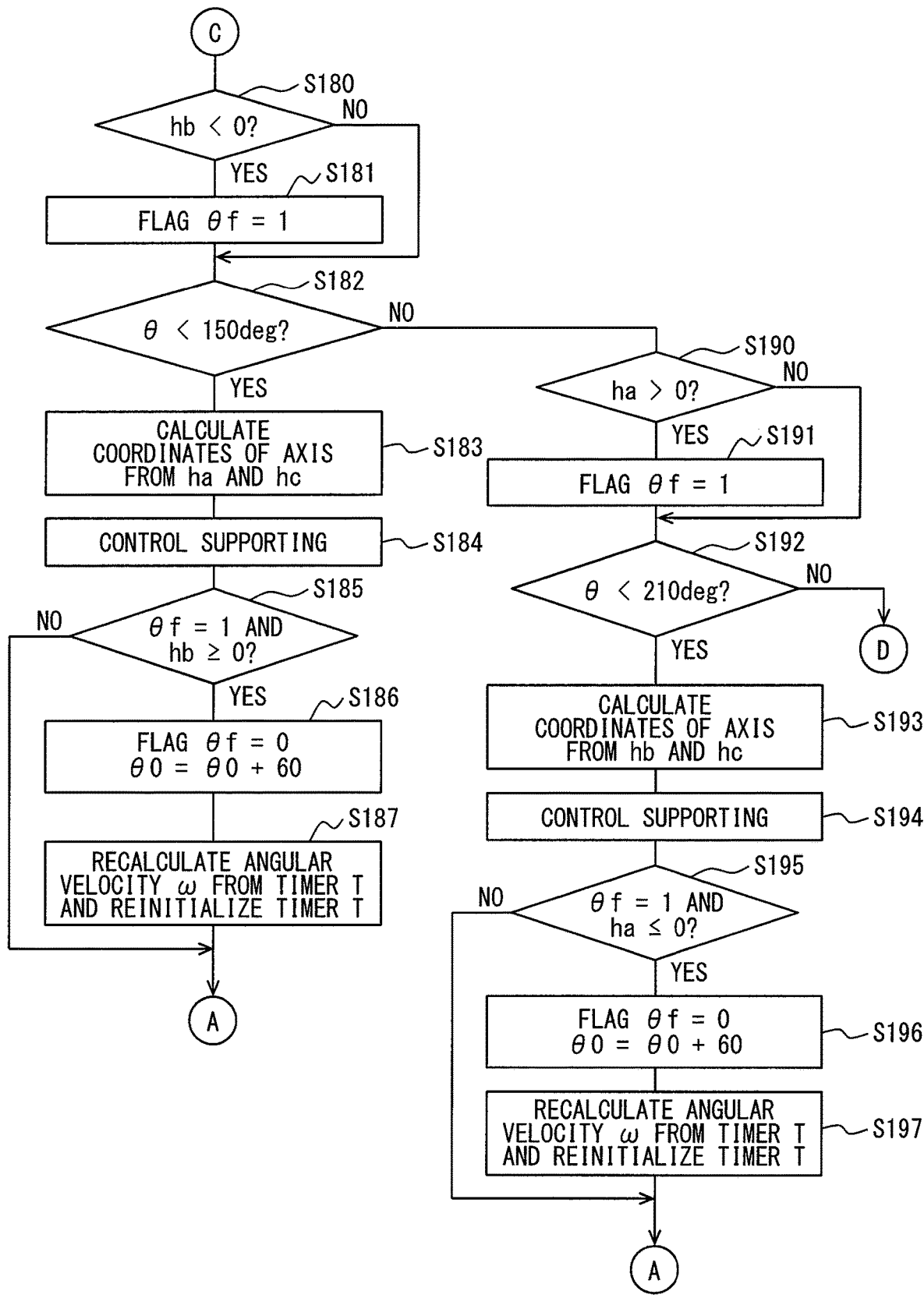
FIG. 18 is a flowchart showing a part of the control processing of the control circuit.
Figure 19:
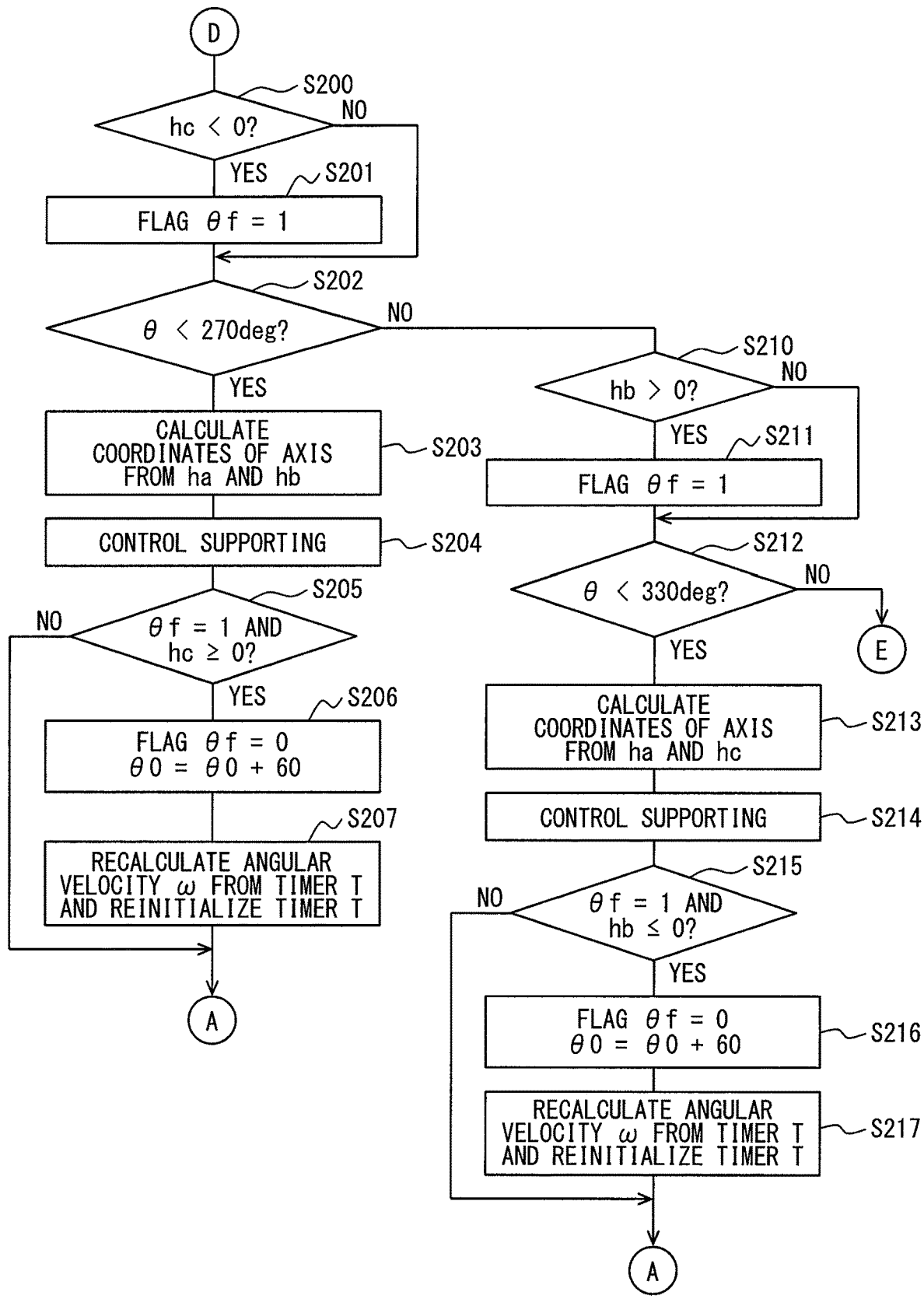
FIG. 19 is a flowchart showing a part of the control processing of the control circuit.

Next, in step 180 of FIG. 18, the control circuit 73 determines based on the digital signal hb determined in step 150 whether the output signal hb of the Hall element 37b is smaller than zero.

At this time, the output signal hb of the Hall element 37b becomes smaller than zero (that is, hb<0), and a determination in step 170 results in YES.

Next, in step 181, the control circuit 73 sets the flag θf to θf=1 in order to store that the output signal hb of the Hall element 37b is smaller than zero.

Next, in step 182, the control circuit 73 determines whether the rotation angle θ calculated in step 130 is smaller than 150 degrees.

At this time, the rotation angle θ of the rotary shaft 30 becomes equal to or smaller than 150 degrees and a determination in step 182 results in YES.

Next, the control circuit 73 determines the XY coordinates (X0, Y0) of the axis line M2 of the rotary shaft 30 on the basis of the digital signals ha and hc in step 183 (that is, coordinate detection section).

Next, in step 184 (that is, the control section), the control circuit 73 performs the supporting control for bringing the axis line M2 of the rotary shaft 30 close to the rotation center line M1 based on the XY coordinates (X0, Y0) of the axis line M2 of the rotary shaft 30.

Next, in step 185, the control circuit 73 determines whether or not each of the following conditions (g) and (h) is satisfied.

(e) The flag θf is "1."

(d) The output signal hb of the Hall element 37b is equal to zero or larger than zero.

At this time, although the flag θf is "1," the output signal hb of the Hall element 37c is smaller than zero. Therefore, the control circuit 73 determines that the condition of (h) is not satisfied, and determines NO in step 185.

Thereafter, the control circuit 73 repeats the processing of steps 130, 140, 150, determination of NO in step 160, determination of NO in step 162, determination of YES in step 170, step 171, determination of NO in step 172, determination of YES in step 180, step 181, determination of YES in step 180, steps 183, 184 and determination of NO in step 185.

Thereafter, when the rotation angle θ of the rotary shaft 30 reaches 120 degrees, the output signal hb of the Hall element 37b becomes zero.

Accordingly, the control circuit 73 determines YES in step 185 because the flag θf is "1" and the output signal hb of the Hall element 37b is zero. As a result, it is determined that the rotation angle θ of the rotary shaft 30 is 120 degrees.

Then, in step 186, the control circuit 73 resets the flag θf to θf=0 and increments the initial value θ0 of the rotation angle θ of the rotary shaft 30 by 60 degrees. That is, θ0=θ0+60 degrees.

Next, the control circuit 73 calculates the angular velocity ω of the rotary shaft 30 again based on the count time T of the timer in step 187.

Specifically, the period from time of determination of YES in step 175 in response to the change of the output signal hc of the Hall element 37c from the positive value to the negative value to time of determination of YES in step 185 in response to the change of the output signal hb of the Hall element 37b from the negative value to the positive value is calculated as the count time T of the timer.

In this case, in the period from the determination of YES in step 175 in response to the change of the output signal hc of the Hall element 37c from the positive value to the negative value to the determination of YES in step 185 in response to the change of the output signal hb of the Hall element 37b from the negative value to the positive value, the rotary shaft 30 rotates 60 degrees.

As a result, the control circuit 73 can calculate the angular velocity ω of the rotary shaft 30 from the rotation angle 60 degrees of the rotary shaft 30 and the count time T of the timer. The calculated angular velocity ω is used to calculate the rotation angle in step 130.

In addition, in step 187, the control circuit 73 reinitializes the count time T of the timer and starts counting the time T by the timer. The timer measures the time of elapse after determination of NO in step 170 as the count time T.

Thereafter, the control circuit 73 repeats the processing of steps 130, 140, 150, determination of NO in step 160, determination of NO in step 162, determination of NO in step 170, determination of NO in step 172, determination of NO in step 180, determination of YES in step 182, steps 183, 184 and determination of NO in step 185.

Thereafter, when the rotation angle θ of the rotary shaft 30 becomes larger than 150 degrees, the control circuit 73 determines NO in step 182.

Next, in step 190, the control circuit 73 determines whether or not the output signal ha of the Hall element 37a is larger than zero based on the digital signal ha determined in step 150 described above.

At this time, the output signal ha of the Hall element 37a becomes larger than zero (that is, ha>0) and the control circuit 73 determines NO in step 190. Thus, in step 191, the control circuit 73 sets the flag θf to θf=1 in order to store that the output signal ha of the Hall element 37a is larger than zero.

Next, in step 192, the control circuit 73 determines whether the rotation angle calculated in step 130 is smaller than 210 degrees.

At this time, the rotation angle θ of the rotary shaft 30 becomes smaller than 210 degrees and a determination in step 192 results in YES.

Next, the control circuit 73 determines the XY coordinates (X0, Y0) of the axis line M2 of the rotary shaft 30 on the basis of the digital signals hb and hc in step 193 (that is, coordinate detection section).

Next, in step 194 (that is, the control section), the control circuit 73 performs the supporting control for bringing the axis line M2 of the rotary shaft 30 close to the rotation center line M1 based on the XY coordinates (X0, Y0) of the axis line M2 of the rotary shaft 30.

Next, in step 195, the control circuit 73 determines whether or not each of the following conditions (i) and (j) is satisfied.

(i) The flag θf is "1."

(j) The output signal ha of the Hall element 37a is zero or smaller than zero.

At this time, the output signal ha of the Hall element 37a is equal to or smaller zero. However, since the flag θ f is "0" and the condition of (i) is not satisfied, the determination in step 195 results in NO.

Thereafter, the control circuit 73 repeats the processing of steps 130, 140, 150, determination of NO in step 160, determination of NO in step 162, determination of NO in step 170, determination of NO in step 172, determination of NO in step 180, determination of NO in step 182, determination of YES in step 190, step 191, determination of YES in step 192, steps 193, 194 and determination of NO in step 195.

Thereafter, when the rotation angle θ of the rotary shaft 30 reaches 180 degrees, the output signal ha of the Hall element 37a becomes zero.

Then, the control circuit 73 determines YES in step 195 because the flag θf is "1" and the output signal ha of the Hall element 37a is equal to or smaller than zero. As a result, it is determined that the rotation angle θ of the rotary shaft 30 is 180 degrees.

Then, in step 196, the control circuit 73 resets the flag θf to θf=0 and increments the initial value θ0 of the rotation angle θ of the rotary shaft 30 by 60 degrees. That is, θ0=θ0+60 degrees.

Next, in step 197, the control circuit 73 calculates the angular velocity ω of the rotary shaft 30 based on the count time T of the timer.

Specifically, the period from time of determination of YES in step 185 in response to the change of the output signal hb of the Hall element 37b from the negative value to the positive value to time of determination of YES in step 195 in response to the change of the output signal ha of the Hall element 37a from the positive value to the negative value is calculated as the count time T of the timer.

In this case, in the period from the determination of YES in step 185 in response to the change of the output signal hb of the Hall element 37b from the negative value to the positive value to the determination of YES in step 195 in response to the change of the output signal ha of the Hall element 37a from the positive value to the negative value, the rotary shaft 30 rotates 60 degrees.

As a result, the control circuit 73 can calculate the angular velocity ω of the rotary shaft 30 from the rotation angle 60 degrees of the rotary shaft 30 and the count time T of the timer. The calculated angular velocity ω is used to calculate the rotation angle in step 130.

In addition, in step 197, the control circuit 73 reinitializes the count time T of the timer and starts counting the time T by the timer. The timer measures the time of elapse after determination of YES in step 195 as the count time T.

Thereafter, the control circuit 73 executes the processing of steps 130, 140, 150, determination of YES in step 160, step 161, determination of NO in step 162, determination of NO in step 170, determination of NO in step 172, determination of NO in step 180, determination of NO in step 182, determination of NO in step 190, determination of YES in step 192 and steps 193, 194.

Then, in step 195, the control circuit 73 determines NO because the flag θf is "0" although the output signal ha of the Hall element 37a is equal to or smaller than zero.

Thereafter, the control circuit 73 repeats the processing of steps 130, 140, 150, determination of YES in step 160, step 161, determination of NO in step 162, determination of NO in step 170, determination of NO in step 172, determination of NO in step 180, determination of NO in step 182, determination of NO in step 190, determination of YES in step 192, steps 193, 194 and determination of NO in step 195.

Thereafter, when the rotation angle θ of the rotary shaft 30 becomes larger than 210 degrees, the control circuit 73 determines NO in step 192.

Next, in step 200, the control circuit 73 determines whether or not the output signal hc of the Hall element 37c is smaller than zero based on the digital signal hc determined in step 150 described above.

At this time, the output signal hc of the Hall element 37c becomes smaller than zero (that is, hc<0), and a determination in step 200 results in YES.

Next, in step 201, the control circuit 73 sets the flag θf to θf=1 in order to store that the output signal hc of the Hall element 37c is smaller than zero.

Next, in step 202, the control circuit 73 determines whether the rotation angle calculated in step 130 is smaller than 210 degrees.

At this time, the rotation angle θ of the rotary shaft 30 becomes smaller than 270 degrees and a determination in step 202 results in YES.

Next, the control circuit 73 determines the XY coordinates (X0, Y0) of the axis line M2 of the rotary shaft 30 on the basis of the digital signals ha and hb in step 203 (that is, coordinate detection section).

Next, in step 204 (that is, the control section), the control circuit 73 performs the supporting control for bringing the axis line M2 of the rotary shaft 30 close to the rotation center line M1 based on the XY coordinates (X0, Y0) of the axis line M2 of the rotary shaft 30.

Next, in step 205, the control circuit 73 determines whether or not each of the following conditions (k) and (l) is satisfied.

(k) The flag θf is "1."

(l) The output signal hc of the Hall element 37c is zero or larger than zero.

At this time, although the flag θf is "1," the output signal hc of the Hall element 37c is smaller than zero. Therefore, by determining that the condition of (l) is not satisfied, the determination result in step 205 is NO.

Thereafter, the control circuit 73 repeats the processing of steps 130, 140, 150, determination of YES in step 160, step 161, determination of NO in step 162, determination of NO in step 170, determination of NO in step 172, determination of NO in step 180, determination of NO in step 182, determination of NO in step 190, determination of NO in step 192, determination of YES in step 200, step 201, determination of YES in step 202, steps 203, 204 and determination of NO in step 205.

Thereafter, when the rotation angle θ of the rotary shaft 30 reaches 240 degrees, the output signal hc of the Hall element 37c becomes zero.

Then, in step 205, the control circuit 73 determines YES because the flag θf is "1" and the output signal hc of the Hall element 37c is equal to or larger than zero. As a result, it is determined that the rotation angle θ of the rotary shaft 30 is 240 degrees.

Then, in step 206, the control circuit 73 resets the flag θf to θf=0 and increments the initial value θ0 of the rotation angle θ of the rotary shaft 30 by 60 degrees. That is, θ0=θ0+60 degrees.

Next, in step 207, the control circuit 73 calculates again the angular velocity ω of the rotary shaft 30 based on the count time T of the timer.

Specifically, the period from time of determination of NO in step 190 in response to the change of the output signal ha of the Hall element 37a from the positive value to the negative value to time of determination of YES in step 205 in response to the change of the output signal hc of the Hall element 37c from the negative value to the positive value is calculated as the count time T of the timer.

In this case, in the period from the determination of NO in step 190 in response to the change of the output signal ha of the Hall element 37a from the positive value to the negative value to the determination of YES in step 205 in response to the change of the output signal hc of the Hall element 37c from the negative value to the positive value, the rotary shaft 30 rotates 60 degrees.

As a result, the control circuit 73 can calculate the angular velocity ω of the rotary shaft 30 from the rotation angle 60 degrees of the rotary shaft 30 and the count time T of the timer. The calculated angular velocity ω is used to calculate the rotation angle in step 130.

In addition, in step 207, the control circuit 73 reinitializes the count time T of the timer and starts counting the time T by the timer. The timer measures the time of elapse after determination of YES in step 195 as the count time T.

Thereafter, the control circuit 73 repeats the processing of steps 130, 140, 150, determination of YES in step 160, step 161, determination of NO in step 162, determination of NO in step 170, determination of NO in step 172, determination of NO in step 180, determination of NO in step 182, determination of NO in step 190, determination of NO in step 192, determination of YES in step 200, step 201, determination of YES in step 202, steps 203, 204 and determination of NO in step 205.

Thereafter, when the rotation angle θ of the rotary shaft 30 becomes larger than 270 degrees, the control circuit 73 determines NO in step 202.

Next, in step 210, the control circuit 73 determines whether or not the output signal hb of the Hall element 37b is larger than zero based on the digital signal hb determined in step 150 described above.

At this time, the output signal hb of the Hall element 37b becomes larger than zero (that is, hb>0) and the control circuit 73 determines YES in step 210.

Next, in step 211, the control circuit 73 sets the flag θf to θf=1 in order to store that the output signal hb of the Hall element 37b is larger than zero.

Next, in step 212, the control circuit 73 determines whether the rotation angle θ calculated in step 130 is smaller than 330 degrees.

At this time, the rotation angle θ of the rotary shaft 30 becomes smaller than 330 degrees and a determination in step 212 results in YES.

Next, the control circuit 73 determines the XY coordinates (X0, Y0) of the axis line M2 of the rotary shaft 30 on the basis of the digital signals ha and hc in step 213 (that is, coordinate detection section).

Next, in step 214 (that is, the control section), the control circuit 73 performs the supporting control for bringing the axis line M2 of the rotary shaft 30 close to the rotation center line M1 based on the XY coordinates (X0, Y0) of the axis line M2 of the rotary shaft 30.

Next, in step 215, the control circuit 73 determines whether or not each of the following conditions (m) and (n) is satisfied.

(m) The flag θf is "1."

(n) The output signal hb of the Hall element 37b is zero or smaller than zero.

At this time, although the flag θf is "1," the output signal hb of the Hall element 37b is larger than zero. Therefore, by determining that the condition of (n) is not satisfied, the determination result in step 215 is NO.

Thereafter, the control circuit 73 repeats the processing of steps 130, 140, 150, determination of YES in step 160, step 161, determination of NO in step 162, determination of YES in step 170, determination of NO in step 172, determination of NO in step 180, determination of NO in step 182, determination of NO in step 190, determination of NO in step 192, determination of NO in step 200, determination of NO in step 202, determination of NO in step 210, determination of NO in step 212, steps 213 and determination of NO in step 215.

Thereafter, when the rotation angle θ of the rotary shaft 30 reaches 300 degrees, the output signal hb of the Hall element 37b becomes zero.

Then, in step 215, the control circuit 73 determines YES because the flag θf is "1" and the output signal hb of the Hall element 37b is equal to or smaller than zero. As a result, it is determined that the rotation angle θ of the rotary shaft 30 is 300 degrees.

Then, in step 215, the control circuit 73 resets the flag θf to θf=0 and increments the initial value θ0 of the rotation angle θ of the rotary shaft 30 by 60 degrees. That is, θ0=θ0+60 degrees.

Next, in step 217, the control circuit 73 calculates again the angular velocity ω of the rotary shaft 30 based on the count time T of the timer.

Specifically, the period from time of determination of YES in step 205 in response to the change of the output signal hc of the Hall element 37c from the negative value to the positive value to time of determination of YES in step 215 in response to the change of the output signal hb of the Hall element 37b from the positive value to the negative value is calculated as the count time T of the timer.

In this case, in the period from the determination of YES in step 205 in response to the change of the output signal hc of the Hall element 37c from the negative value to the positive value to the determination of YES in step 215 in response to the change of the output signal hb of the Hall element 37b from the positive value to the negative value, the rotary shaft 30 rotates 60 degrees.

As a result, the control circuit 73 can calculate the angular velocity ω of the rotary shaft 30 from the rotation angle 60 degrees of the rotary shaft 30 and the count time T of the timer. The calculated angular velocity ω is used to calculate the rotation angle in step 130.

In addition, in step 217, the control circuit 73 reinitializes the count time T of the timer and starts counting the time T by the timer. The timer measures the time of elapse after determination of YES in step 215 as the count time T.

Thereafter, the control circuit 73 repeats the processing of steps 130, 140, 150, determination of YES in step 160, step 161, determination of NO in step 162, determination of YES in step 170, determination of NO in step 172, determination of YES in step 180, step 181, determination of NO in step 182, determination of NO in step 190, determination of NO in step 192, determination of YES in step 200, determination of NO in step 202, determination of NO in step 210, determination of YES in step 212 and steps 213, 214.

Then, in step 215, the control circuit 73 determines NO because the flag θf is "0," although the output signal hc of the Hall element 37c is equal to or smaller than zero.

Thereafter, the control circuit 73 repeats the processing of steps 130, 140, 150, determination of YES in step 160, step 161, determination of YES in step 162, determination of YES step 170, determination of NO in step 172, determination of NO in step 180, determination of NO in step 182, determination of NO in step 190, determination of NO in step 192, determination of NO in step 200, determination of NO in step 202, determination of NO in step 210, determination of NO in step 212, steps 213, 214 and determination of NO in step 215.

Thereafter, when the rotation angle θ of the rotary shaft 30 becomes larger than 330 degrees, the control circuit 73 determines NO in step 212.

Figure 17:
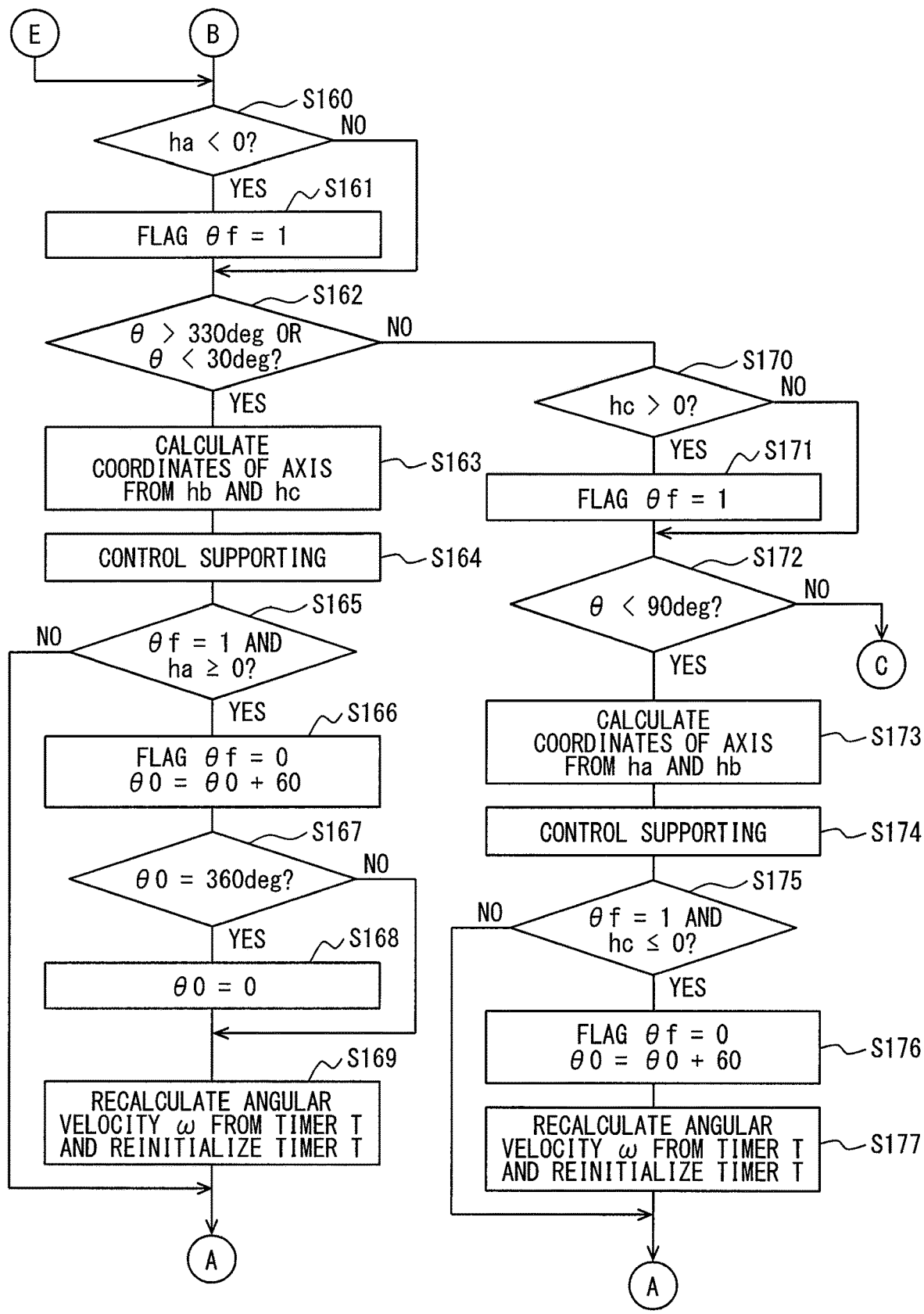
FIG. 17 is a flowchart showing a part of the control processing of the control circuit.

Next, in step 160 in FIG. 17, the control circuit 73 determines based on the digital signal ha whether the output signal ha of the Hall element 37a is smaller than zero.

At this time, the output signal ha of the Hall element 37a becomes smaller than zero (that is, ha<0), and a determination in step 160 results in YES. Next, in step 161, the control circuit 73 sets the flag θf to θf=1 in order to store that the output signal ha of the Hall element 37a is smaller than zero.

At this time, the rotation angle θ of the rotary shaft 30 becomes equal to or larger than 330 degrees and the control circuit 73 determines YES in step 162.

Next, the control circuit 73 executes steps 163 and 164, and thereafter executes the determination of step 165.

At this time, although the flag θ f is "1," the output signal ha of the Hall element 37a is smaller zero. Therefore, since the condition (d) is not satisfied, determination in step 165 results in NO.

Thereafter, the control circuit 73 repeatedly executes the processing of steps 130, 140, 150, determination of YES in step 160, step 161, determination of YES in step 162, steps 163, 164 and determination of NO in step 165.

Thereafter, when the rotation angle θ of the rotary shaft 30 reaches 360 degrees, the output signal ha of the Hall element 37a becomes zero.

Then, the control circuit 73 determines YES in step 165 because the flag θf is "1" and the output signal ha of the Hall element 37a is equal to or larger than zero. As a result, it is determined that the rotation angle θ of the rotary shaft 30 is 360 degrees.

Then, in step 165, the control circuit 73 resets the flag θf to θf=0 and increments the initial value θ0 of the rotation angle θ of the rotary shaft 30 by 60 degrees. That is, θ0=θ0+60 degrees.

Next, in step 167, the control circuit 73 determines whether or not the initial value θ0 of the rotation angle θ of the rotary shaft 30 is 360 degrees At this time, it is determined in step 167 that the initial value θ0 of the rotation angle θ of the rotary shaft 30 is 360 degrees, and the determination results in YES. Next, in step 168, the control circuit 73 resets the initial value θ0 of the rotation angle θ of the rotary shaft 30 to the initial value θ0=0.

Next, in step 169, the control circuit 73 calculates again the angular velocity ω of the rotary shaft 30 based on the count time T of the timer.

Specifically, the period from time of determination of YES in step 215 in response to the change of the output signal hb of the Hall element 37b from the positive value to the negative value to time of determination of YES in step 165 in response to the change of the output signal ha of the Hall element 37a from the negative value to the positive value is calculated as the count time T of the timer.

In this case, in the period from the determination of YES in step 215 in response to the change of the output signal hb of the Hall element 37b from the positive value to the negative value to the determination of YES in step 165 in response to the change of the output signal ha of the Hall element 37a from the negative value to the positive value, the rotary shaft 30 rotates 60 degrees.

As a result, the control circuit 73 can calculate the angular velocity ω of the rotary shaft 30 from the rotation angle 60 degrees of the rotary shaft 30 and the count time T of the timer. The calculated angular velocity ω is used to calculate the rotation angle in step 130.

In addition, in step 168, the control circuit 73 reinitializes the count time T of the timer and starts counting the time T by the timer. The timer measures the time of elapse after determination of YES in step 168 as the count time T.

Next, the control circuit 73 executes steps 130, 140, 150 and determination of NO in step 160. Thereafter, in step 162, the control circuit 73 determines YES as the rotation angle θ of the rotary shaft 30 satisfies θ0<30 degrees. Thereafter, similarly to the above, the control circuit 73 executes the control processing.

As described above, the rotation angle θ of the rotary shaft 30 is determined in steps 165, 175, 185, 195, 205 and 215, and the XY coordinates of the axis line M2 of the rotary shaft 30 are calculated in steps 163, 173, 183, 193, 203 and 213. Among the Hall elements 37a, 37b and 37c, the Hall elements used for determining the XY coordinates of the axis line M2 of the rotary shaft 30 and the Hall element used in the determination of the rotation angle θ of the rotary shaft 30 are switched over based on the rotation of the rotary shaft 30.

Next, the coordinate calculation processing of steps 163, 173, 183, 193, 203 and 213 for determining the XY coordinates (X0, Y0) of the axis line M2 of the rotary shaft 30 in this embodiment will be described.

First, when the magnetic pole boundary K 1 of the permanent magnet 38 is opposed to one Hole element of the Hall elements 37a, 37b, 37c, the control circuit 73 determines the XY coordinates (X0, Y0) of the axis line M2 of the rotary shaft 30 on the basis of the output signals of two Hall elements, which are other than the one Hall element of the Hall elements 37a, 37b, 37c.

Figure 20:
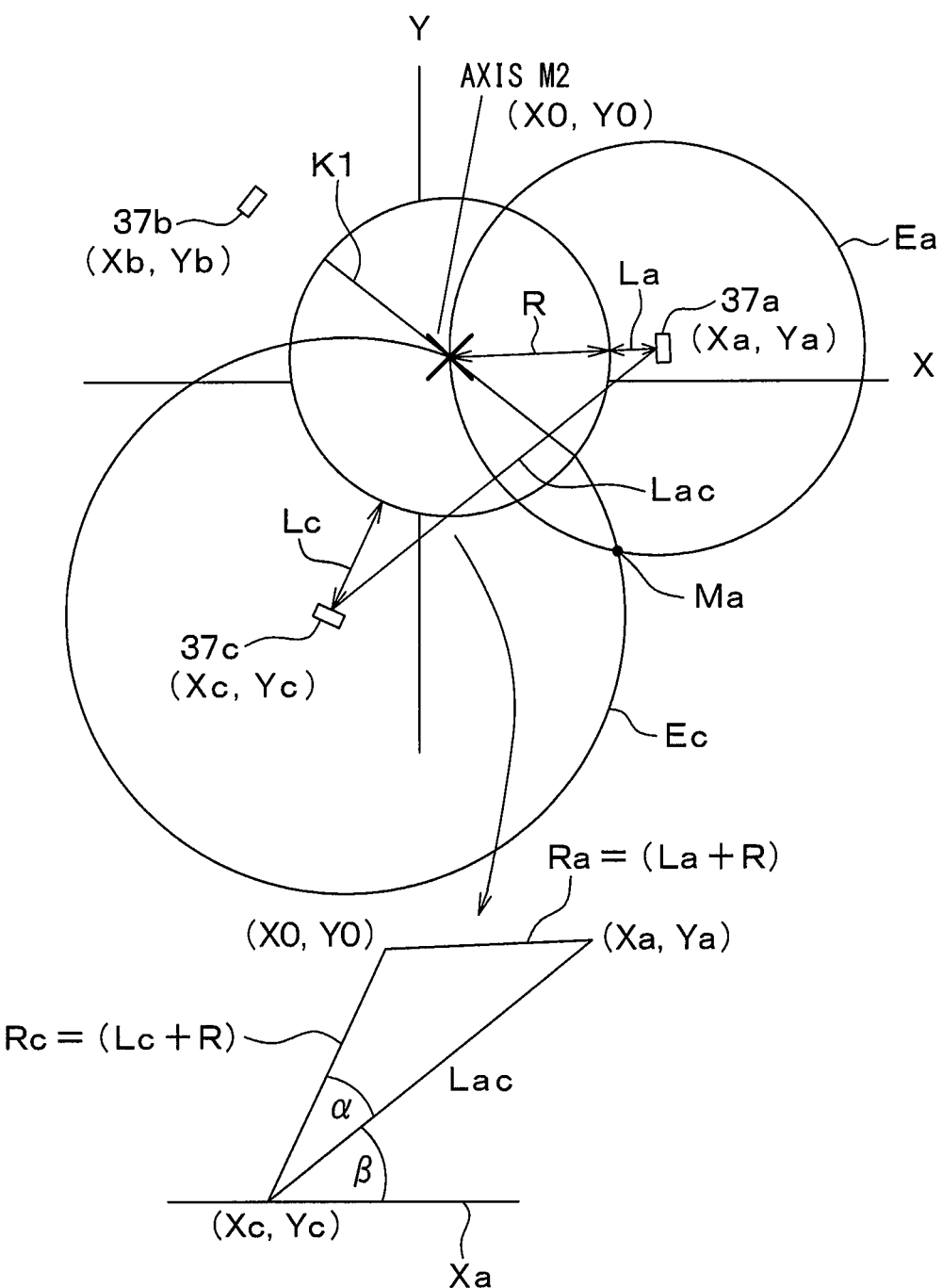
FIG. 20 is a diagram for explaining process of determining X and Y coordinates of the axis line of the rotary shaft in the control circuit.

FIG. 20 shows a specific example in which the Hall element 37b is opposed to the magnetic pole boundary K1 of the permanent magnet 38. In FIG. 20, the XY coordinates of the Hall element 37a are assumed to be (Xa, Ya), the XY coordinates of the Hall element 37b are assumed to be (Xb, Yb), and the XY coordinates of the Hall element 37c are assumed to be (Xc, Yc).

In the present embodiment, the output signal ha of the Hall element 37a, the output signal hc of the Hall element 37c and the XY coordinates (X0, Y0) of the axis line M2 of the rotary shaft 30 are specified in one-to-one-to-one relationship. For this reason, the XY coordinates (X0, Y0) of the axis line M2 of the rotary shaft 30 is determined from the output signals ha and hc of the Hall elements 37a and 37c as described below.

First, it is assumed that a radius of the permanent magnet 38 is R, a shortest distance between the XY coordinates (Xa, Ya) of the Hall element 37a and the permanent magnet 38 is La, and a shortest distance between the XY coordinates (Xc, Yc) of the Hall element 37c and the permanent magnet 38 is Lc. The distance between the Hall element 37a and the Hall element 37c is assumed to be Lac.

Here, as the shortest distance La increases, the output signal ha of the Hall element 37a decreases. As the shortest distance La decreases, the output signal hc of the Hall element 37c increases. For this reason, the output signal ha of the Hall element 37a and the shortest distance La are in a one-to-one relationship, so that the shortest distance La is determined based on the output signal ha of the Hall element 37a.

The distance Ra between the XY coordinates (Xa, Ya) of the Hall element 37a and the XY coordinates (X0, Y0) of the axis line M2 of the rotary shaft 30 is determined by adding the radius R of the permanent magnet 38 to the shortest distance La. Ra=La+R As the shortest distance Lc increases, the output signal hc of the Hall element 37c decreases. As the shortest distance Lc decreases, the output signal hc of the Hall element 37c increases. For this reason, the output signal hc of the Hall element 37c and the shortest distance Lc are in a one-to-one relationship, so that the shortest distance Lc is determined based on the output signal hc of the Hall element 37c.

The distance Rc between the XY coordinates (Xc, Yc) of the Hall element 37c and the XY coordinates (X0, Y0) of the axis line M2 of the rotary shaft 30 is determined by adding the radius R of the permanent magnet 38 to the shortest distance Lc by the following equation. Rc=Lc+R The distance Lac is determined from the XY coordinates (Xa, Ya) and the XY coordinates (Xc, Yc).

An angle formed by a line segment connecting the XY coordinates (X0, Y0) and the XY coordinates (Xc, Yc) and a line segment connecting the XY coordinates (Xc, Yc) and the XY coordinates (Xa, Ya) is assumed to be α.

An angle formed by a line segment connecting the XY coordinates (Xa, Ya) and the XY coordinates (Xc, Yc) and a line segment Xa passing through the XY coordinates (Xc, Yc) and extending in parallel to the X axis is assumed to be β.

First, a circle Ea whose radius is Ra (that is, La+R) is drawn around the XY coordinates (Xa, Ya) of the Hall element 37a as the center and a circle Ec whose radius is Rc (that is, Lc+R) is drawn around the XY coordinates (Xb, Yb) of the Hall element 37b as a center. Then the coordinates (X0, Y0) are determined as intersecting coordinates of the circle Ea and the circle Ec.

Specifically, the distance Lac and the angle β are determined by the following Equations (1) and (2).

$$Lac=\sqrt{((Xa-Xc)^2+(Ya-Yc)^2)} \quad \text{(Equation 1)}$$

$$\beta=\tan^{-1}((Ya-Yc)/(Xa-Xc)) \quad \text{(Equation 2)}$$

Next, using the cosine theorem, the angle α in FIG. 20 is determined by the following Equations (3), (4) and (5).

$$Ra^2=Rc^2+Lac^2-2\cdot Rc\cdot Lac\cdot \cos\alpha \text{(cosine theorem)} \quad \text{(Equation 3)}$$

$$\cos\alpha=(Rc^2+Lac^2-Ra^2)/(2\cdot Rc\cdot Lac) \quad \text{(Equation 4)}$$

$$\alpha=\cos^{-1}(Rc^2+Lac^2-Ra^2)/(2\cdot Rc\cdot Lac) \quad \text{(Equation 5)}$$

Next, the coordinates (X0, Y0) are calculated from R, α, β, etc.

$$X0=Xc+(R+Lc)\cdot\cos(\beta+\alpha) \quad \text{(Equation 6)}$$

$$Y0=Xc+(R+Lc)\cdot\sin(\beta+\alpha) \quad \text{(Equation 7)}$$

There are two intersecting coordinates of the circle Ea and the circle Eb. Although the coordinates (X0', Y0') of the intersection Ma other than the coordinates (X0, Y0) is determined, it is possible to easily distinguish the coordinates (X0', Y0') and the coordinates (X0, Y0) from each other depending on the positional relationship.

$$X0'=Xc+(R+Lc)\cdot\cos(\beta-\alpha) \quad \text{(Equation 8)}$$

$$Y0'=Xc+(R+Lc)\cdot\sin(\beta-\alpha) \quad \text{(Equation 9)}$$

As described above, the output signal ha of the Hall element 37a, the output signal hc of the Hall element 37c and the XY coordinates (X0, Y0) of the axis line M2 of the rotary shaft 30 are in one-to-one-to-one relationship. For this reason, the XY coordinates (X0, Y0) of the axis line M2 of the rotary shaft 30 is determined from the output signals ha, hc of the Hall elements 37a, 37c.

Similarly, when the magnetic pole boundary K1 of the permanent magnet 38 is opposed to the Hall element 37c, the output signal ha of the Hall element 37a, the output signal hb of the Hall element 37b and the XY coordinates (X0, Y0) of the axis line M2 of the rotary shaft 30 are in one-to-one-to-one relationship. For this reason, the XY coordinates (X0, Y0) of the axis line M2 of the rotary shaft 30 is determined from the output signals ha, hb of the Hall elements 37a, 3b.

Further, when the magnetic pole boundary K 1 of the permanent magnet 38 is opposed to the Hall element 37a, the output signal hb of the Hall element 37b, the output signal 37c of the Hall element 37c and the the XY coordinates (X0, Y0) of the axis line M2 of the rotary shaft 30 are in one-to-one-to-one relationship. For this reason, the XY coordinates (X0, Y0) of the axis line M2 of the rotary shaft 30 is determined from the output signals hb, hc of the Hall elements 37b, 37c.

Next, details of the supporting control of the control circuit 73 will be described. As described above, the the control circuit 73 determines the XY coordinates (X0, Y0) of the axis line M2 of the rotary shaft 30 and the control circuit 73 controls the transistors SW1, SW2, SW3, SW4, SW5 and SW6 based on the XY coordinates (X0, Y0) to control the axis line M2 of the rotary shaft 30 closely to the rotation center line M1.

As a result, the currents supplied from the common connection terminals T1, T2, T3 to the coils 50a, 50b, 50c are controlled. Therefore, by controlling the coefficients K1, K2, K3, it is possible to control the magnitude and the direction of the supporting force Fa so that the axis line M2 of the rotary shaft 30 is brought to be close to the rotation center line M1.

In the electric motor system 1 of the present embodiment described above, the electric motor 10 includes the rotor 36, the rotary shaft 30 which is provided so that the axis line M2 is displaceable relative to the rotation center M1 and outputs the rotational force of the rotor 36, the stator 35 for generating the rotational force on the rotor 36 by electromagnetic force, the magnetic bearing for rotatably supporting the rotary shaft 30 by the electromagnetic force, the permanent magnet 38 mounted on the rotary shaft 30 and having a pair of N pole and S pole arranged in the circumferential direction around the axis line M2 of the rotary shaft 30 as its center and the Hall elements 37a, 37b, 37c arranged in the circumferential direction around the rotation center M1 for detecting the density of magnetic flux generated from the permanent magnet 38. The control circuit 73 determines the coordinates of the axis line M2 of the rotary shaft 30 based on the output values of the two Hall elements selected according to the rotation angle of the rotary shaft 30 among the Hall elements 37a, 37b, 37c. At the same time, the control circuit 73 controls the magnetic bearing so that the axis line of the rotary shaft is brought to be close to the rotation center on the basis of the calculated coordinates.

Since three Hall elements 37a, 37b, and 37c detect the magnetic fluxes, a distance from each Hall element to the magnet is specified by using the detection result of the individual Hall element. Therefore, it is possible to reduce the number of detection elements as compared with the conventional case. If the distances from the two Hall elements to the magnet are determined, the coordinates of the axis line M2 is determined but the output signal of the Hall element close to the boundary of the plurality of magnetic poles arranged in the circumferential direction becomes unstable, so that three Hall elements 37a, 37b, 37c are required. Therefore, in the electric motor 10 that supports the rotary shaft 30 with the magnetic bearing, it is possible to control the magnetic bearing with the three Hall elements 37a, 37b, 37c. Therefore, it is possible to reduce the number of Hall elements used for controlling the magnetic bearing.

Figure 21:
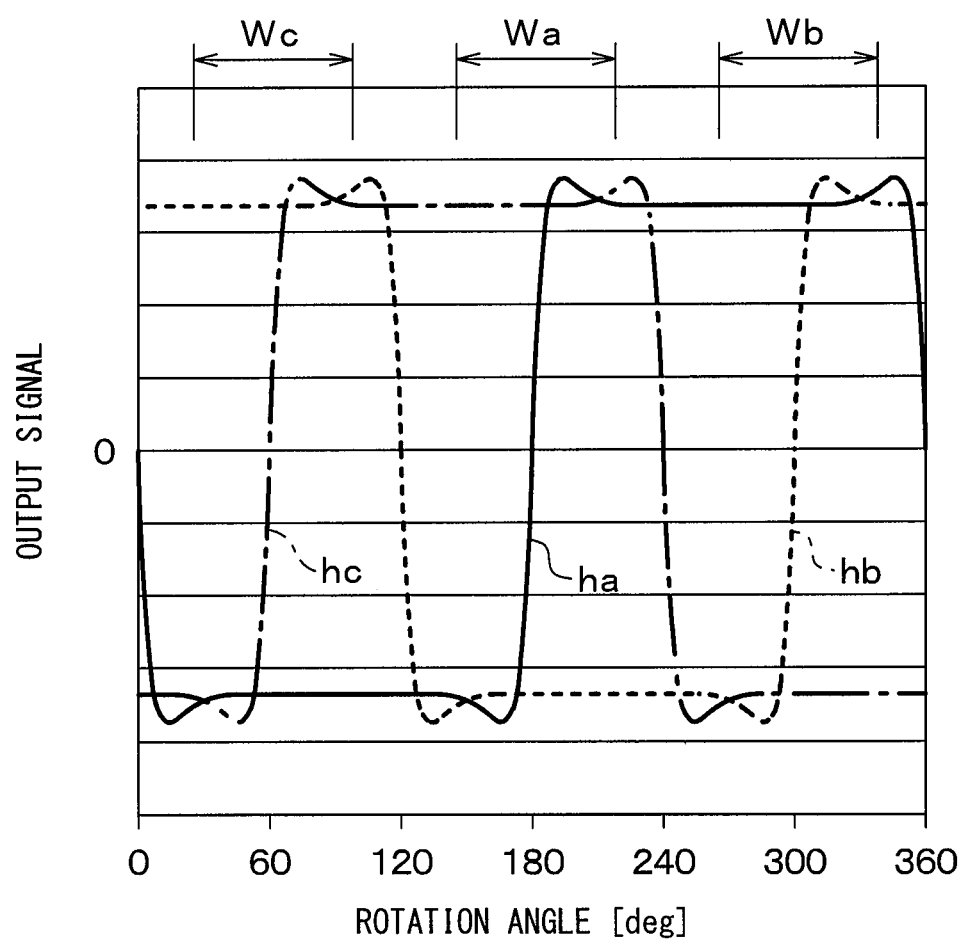
FIG. 21 is a diagram showing a relationship between the output signal of the Hall element shown in FIG. 8 and the rotation angle of the rotary shaft.

Here, as shown in FIG. 21, in an angular range Wa before and after the rotation angle θ (that is, 0 degrees, 180 degrees) at which the output signal ha of the Hall element 37a becomes zero, the output signal ha of the Hall element 37a becomes unstable. In an angular range Wb before and after the rotation angle θ (that is, 120 degrees, 300 degrees) at which the output signal hb of the Hall element 37b becomes zero, the output signal hb of the Hall element 37b becomes unstable. In an angular range Wc before and after the rotation angle θ (that is, 60 degrees, 240 degrees) at which the output signal hc of the Hall element 37c becomes zero, the output signal hc of the Hall element 37c becomes unstable.

Therefore, in the present embodiment, when the rotation angle of the rotor 36 is within angular ranges excluding the angular ranges Wa, Wb, Wc, the control circuit 73 calculates the XY coordinates (X0, Y0) of the axis line M2 of the rotor 30.

Specifically, when the rotation angle of the rotor 36 is within the angular ranges of 30 degrees to 90 degrees and 210 degrees to 270 degrees, the control circuit 73 calculates the XY coordinates (X0, Y0) of the axis line M2 of the rotary shaft 30 based on the output signals ha and hb of the Hall elements 37a and 37b.

When the rotation angle of the rotor 36 is in the angular ranges of 90 degrees to 150 degrees and 270 degrees to 330 degrees, the control circuit 73 calculates the XY coordinates (X0, Y0) of the axis line M2 of the rotary shaft 30 based on the output signals ha and hc of the Hall elements 37a and 37c.

When the rotation angle of the rotor 36 is in the angular ranges of −30 degrees to 30 degrees and 150 degrees to 210 degrees, the control circuit 73 calculates the XY coordinates (X0, Y0) of the axis line M2 of the rotary shaft 30 based on the output signals hb and hc of the Hall elements 37b and 37c.

Thus, the control circuit 73 calculates the XY coordinates (X0, Y0) of the axis line M2 of the rotary shaft 30 based on the output signals of the two Hall elements among the Hall elements 37a, 37b, 37c, the output signals of which are stable. Therefore, the XY coordinates (X0, Y0) of the axis line M2 of the rotary shaft 30 is determined with high accuracy.

In the present embodiment, the control circuit 73 repeatedly calculates the angular velocity ω of the rotary shaft 30 using the output signals of the Hall elements 37a, 37b, 37c. Therefore, even when the rotation speed of the rotary shaft 30 changes, the angular velocity ω, and eventually the rotation angle of the rotary shaft 30, is accurately determined.

Here, in case that the Hall elements 37a, 37b, 37c are positioned so that an imaginary line connecting two arbitrary Hall elements among the Hall elements 37a, 37b, 37c passes through the rotation center line M1, the following problem will arise.

That is, the output signals of the first and second Hall elements other than one Hall element used for detecting the rotation angle θ of the permanent magnet 38 among the Hall elements 37a, 37b, 37c and the XY coordinates (X0, Y0) of the axis line M2 of the rotary shaft 30 are not in one-to-one-to-one relationship. As a result, the XY coordinates (X0, Y0) of the axis line M2 of the rotary shaft 30 is not determined by the output signals of the first and second Hall elements.

For this reason, in the present embodiment, the Hall elements 37a, 37b, 37c are positioned such that each imaginary line connecting any two Hall elements among the Hall elements 37a, 37b, 37 deviates from the rotation center line M1.

Therefore, the output signals of the first and second Hall elements other than one Hall element used for detecting the rotation angle θ of the permanent magnet 38 among the Hall elements 37a, 37b, 37c and the XY coordinates (X0, Y0) are specified on a one-to-one-to-one relationship. As a result, it is possible to determine the XY coordinates (X0, Y0) of the axis line M2 of the rotary shaft 30 based on the output signals of the first and second Hall elements.

Other Embodiments (1) In the embodiment described above, the electric motor 10 is exemplified as being the outer rotor type electric motor, in which the plurality of permanent magnets 61 of the rotor 36 is arranged radially outward relative to the stator 35 in the radial direction around the axis S is referred to as an electric motor of the present disclosure. However, the electric motor may be modified as follows.

That is, the electric motor 10 of the present disclosure may be an inner rotor type electric motor in which a plurality of permanent magnets 61 of the rotor 36 is positioned radially inward with respect to the stator 35 around the axis line M2.

In this case, the supporting section 60a of the rotor case 60 connected to the rotary shaft 30 is arranged on the other side in the axial direction relative to the stator 35 (that is, coils 50a, 50b, 50c, the coils 51a, 51b, 51c).

(2) In the embodiment described above, the electric motor 10 of the present disclosure is exemplified as being a synchronous three-phase AC motor. Alternatively, the electric motor 10 of the present disclosure may be an induction type electric motor or a direct current electric motor.

(3) In the embodiment described above, the bearing 32, which is a mechanical bearing, is exemplified as a rolling bearing. Alternatively, the bearing 32 may be a sliding bearing and a fluid bearing. The sliding bearing is a bearing which receives a shaft on a sliding surface. The fluid bearing is a bearing which supports a shaft by fluid or gas.

(4) In the embodiment described above, the coils 50a, 50b, 50c are connected in the star connection. Alternatively the coils 50a, 50b, 50c may be connected in a delta connection.

Alternatively, the control circuit 73 may independently control the currents supplied from the DC power source Ba to the coils 50 a, 50 b, 50 c separately from one another.

(5) In the embodiment described above, the coils 51a, 51b, 51c are exemplified to be connected in the star connection. Alternatively the coils 50a, 50b, 50c may be connected in a delta connection.

(6) In the embodiment described above, the Z coordinate of the Hall element 37a, the Z coordinate of the Hall element 37b and the Z coordinate of the Hall element 37c are exemplified to coincide with each other. Alternatively, The Hall elements 37a, 37b, 37c may be arranged so that the Z coordinates of any two of the Hall elements of the Z coordinate of the Hall element 37a, the Z coordinate of the Hall element 37b and the Z coordinate of the Hall element 37c do not coincide.

(7) In the embodiment described above, the coils 51a, 51b, 51c are exemplified to be connected in the star connection. Without being limited to this connection, a current control circuit which controls the currents supplied to the coils 51a, 51b, 51c separately may be used.

(8) In the embodiment described above, the coils 50a, 50b, 50c are exemplified to be connected in the star connection. Without being limited to this connection, a current control circuit which controls the currents supplied to the coils 50a, 50b, 50c separately may be used.

(9) In the above-described embodiment, as one example, one side of the rotary shaft 30 of the electric motor 10 in the axial direction is supported by the mechanical bearing and the other side of the rotary shaft 30 in the axial direction is supported by the magnetic bearing. Alternatively, the one side of the rotary shaft 30 of the electric motor 10 in the axial direction may be supported by the magnetic bearing, and the other side of the rotary shaft 30 in the axial direction may be supported by the magnetic bearing.

(10) In the embodiment described above, the S pole and the N pole, which are two magnetic poles of the permanent magnet, are arranged in the circumferential direction. Alternatively, four or more magnetic poles may be arranged in the circumferential direction.

(11) In the embodiment described above, the permanent magnet 61 forming the magnetic bearing and the permanent magnet 38 for determining the coordinates of the axis line M2 of the rotary shaft 30 and the rotation angle of the rotary shaft 30 are separately provided as one example. Alternatively, the permanent magnet 61 forming the magnetic bearing and the permanent magnet 30 for determining the coordinates of the axis line M2 of the rotary shaft 30 and the rotation angle of the rotary shaft 30 may be provided by one common magnet in the electric motor 10.

(12) In the embodiment described above, the Hall element is used exemplarily as the detection element for detecting the magnetic flux density. Alternatively, a magnetic sensor other than the Hall element may be used.

(13) In the embodiment described above, the Hall elements 37a, 37b, 37c are exemplified to be arranged at equiangular intervals in the circumferential direction around the rotation center M1. However, without being limited to this arrangement, the Hall elements 37a, 37b, 37c need not be arranged at equiangular intervals in the circumferential direction around the rotation center M1 as far as the arbitrary two Hall elements of the Hall elements 37a, 37b, 37c are out of the point symmetric positions relative to the rotation center M1.

(14) In the embodiment described above, the permanent magnet 38 is exemplified as being directly mounted on the rotary shaft 30 in the electric motor 10. Alternatively, the permanent magnet 38 may be mounted on the rotary shaft 30 via another member.

For example, the permanent magnet 38 may be attached to the rotary shaft 30 via the rotor 36. That is, the permanent magnet 38 may be positioned on a part of the rotor 36 so that the permanent magnet 38 can be rotated together with the rotary shaft 30.

(15) In the embodiment described above, the XY coordinates of the axis line M2 of the rotary shaft 30 are exemplified as being the XY coordinates of the axis line M2 at the other end of the rotary shaft 30 in the axial direction. However, without being limited to this example, the XY coordinates of the axis line M2 of the rotary shaft 30 may be XY coordinates of the axis line M2 in any part as far as it is the XY coordinates of the axis line M2 at the other axial side of the fulcrum supported by the bearing 32 on the rotary shaft 30.

(16) The present disclosure is not limited to the embodiments described above but may be appropriately modified. Further, the embodiments described above are not necessarily unrelated to each other and may be combined appropriately unless such a combination is obviously impossible. Further, each structural element of the embodiments described above is not necessarily essential unless it is specifically described as being essential or understood as being essential in principle. A quantity, a value, an amount, a range, or the like referred to in the description of the embodiments described above is not necessarily limited to such a specific value, amount, range or the like unless it is specifically described as essential or understood as being essential in principle. Furthermore, a shape, positional relationship or the like of a structural element, which is referred to in the embodiments described above, is not limited to such a shape, positional relationship or the like, unless it is specifically described or obviously necessary to be limited in principle.

CONCLUSION

According to a first aspect described with reference to the first to third embodiments and a part or whole of the other embodiments, an electric motor system comprises a rotor, a rotary shaft provided to have an axis line displaceable relative to a rotation center and outputting a rotational force of the rotor, a stator for generating the rotational force of the rotor by an electromagnetic force, a magnetic bearing for supporting the rotary shaft rotatably by an electromagnetic force, a permanent magnet mounted on the rotary shaft and having a plurality of magnetic poles arranged in a circumferential direction around the axis line of the rotary shaft, three detection elements arranged in the circumferential direction around the rotation center for detecting a magnetic flux generated from the permanent magnet, a coordinate detection section for determining coordinates of the axis line of the rotary shaft based on output values of two detection elements selected out of the three detection elements in accordance with a rotation angle of the rotary shaft, and a control section for controlling the magnetic bearing so that the axis line of the rotary shaft is brought to be close to the rotation center based on the coordinates determined by the coordinate detection section.

According to a second aspect, the three detection elements are arranged such that an imaginary line connecting any two detection elements among the three detection elements deviates from the rotation center.

According to a third aspect, the three detection elements are arranged at equal angular intervals in the circumferential direction around the rotation center.

According to a fourth aspect, there is provided the rotation angle detection section for detecting the rotation angle of the rotary shaft based on the output value of one detection element among the three detection elements and the rotation control section for controlling the stator so as to generate the rotational force of the rotor based on the rotation angle detected by the rotation angle detection section.

As a result, it is possible to use the output signals of the three detection elements in controlling the stator.

Specifically, according to a fifth aspect, the rotation angle detection section detects the rotation angle of the rotary shaft based on the output value of the one detection element by detecting an arrival of a boundary, which is between adjacent two magnetic poles out of the plurality of magnetic poles of the permanent magnet, at an angle, at which the one detection element is positioned.

According to a sixth aspect, the coordinate detection section determines the coordinates of the axis line based on the output values of the two detection elements other than the one detection element among the three detection elements, and the detection elements used in the coordinate detection section and the detection element used in the rotation angle detection section are switched over in accordance with the rotation of the rotary shaft.

Furthermore, according to a seventh aspect, the coordinate detection section determines the coordinates of the axis line based on the output values of the two detection elements, when the rotation angle of the permanent magnet is within a range from a detection start angle to a detection end angle, assuming that the rotation angle of the rotary shaft at which the boundary between the adjacent two magnetic poles among the plurality of magnetic poles arrives at the angle at which one detection elements between two detection elements is positioned when the permanent magnet is rotated is the first rotation, the rotation angle of the rotary shaft at which the boundary arrives at the angle at which the other detection element other than the one detection element is positioned when the permanent magnet is rotated after passing the first rotation angle is the second angle, the detection start angle is an angle advanced from the first rotation angle by a predetermined angle and the detection end angle is an angle retarded by the predetermined angle from the second rotation angle.

The coordinate detection section determines the coordinates of the axis line based on the output values of the two detection elements, when the rotation angle of the permanent magnet is within the range from a detection start angle to a detection end angle

What is claimed is:

1. An electric motor system comprising:
 a rotor;
 a rotary shaft provided to have an axis line thereof to be displaceable relative to a rotation center and outputting a rotational force of the rotor;
 a stator for generating the rotational force on the rotor by an electromagnetic force;
 a magnetic bearing for rotatably supporting the rotary shaft by an electromagnetic force;
 a permanent magnet mounted on and in contact with the rotary shaft and having a plurality of magnetic poles arranged in a circumferential direction around the axis line of the rotary shaft;
 three detection elements arranged in the circumferential direction around the rotation center and detecting a magnetic flux generated from the permanent magnet;
 a coordinate detection section for determining coordinates of the axis line of the rotary shaft based on output values of two detection elements selected out of the three detection elements in accordance with a rotation angle of the rotary shaft; and
 a control section for controlling the magnetic bearing so that the axis line of the rotary shaft is brought to be close to the rotation center based on the coordinates determined by the coordinate detection section.

2. The electric motor system according to claim 1, wherein:
 the three detection elements are arranged such that an imaginary line connecting any two detection elements among the three detection elements deviates from the rotation center.

3. The electric motor system according to claim 1, wherein:
 the three detection elements are arranged at equal angular intervals in the circumferential direction around the rotation center.

4. The electric motor system according to claim 1, further comprising:
 a rotation angle detection section for detecting a rotation angle of the rotary shaft based on the output value of one detection element among the three detection elements; and
 a rotation control section for controlling the stator to generate the rotational force on the rotor based on the rotation angle detected by the rotation angle detection section.

5. The electric motor system according to claim 4, wherein:
 the rotation angle detection section detects the rotation angle of the rotary shaft by detecting an arrival of a boundary, which is between adjacent two magnetic poles among the plurality of magnetic poles of the permanent magnet, at an angle, at which the one detection element is positioned based on the output value of the one detection element.

6. The electric motor system according to claim 4, wherein:
 the coordinate detection section determines the coordinates of the axis based on the output values of the two detection elements other than the one detection element among the three detection elements; and
 among the three detection elements, the detection elements used in the coordinate detection section and the detection element used in the rotation angle detection section are switched over in accordance with a rotation of the rotary shaft.

7. The electric motor system according to claim 1, wherein:
 the permanent magnet does not contact any component of the electric motor system other than the rotary shaft.

8. The electric motor system according to claim 1, wherein:
 the permanent magnet is in contact with only the rotary shaft.

9. The electric motor system according to claim 1, wherein:
 the three detection elements are spaced apart from and opposed to the permanent magnet.

* * * * *